(12) United States Patent
Kubota et al.

(10) Patent No.: US 12,259,499 B2
(45) Date of Patent: Mar. 25, 2025

(54) LIGHT DETECTOR AND DISTANCE MEASUREMENT DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hiroshi Kubota, Yokohama Kanagawa (JP); Nobu Matsumoto, Ebina Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 1049 days.

(21) Appl. No.: 17/200,087

(22) Filed: Mar. 12, 2021

(65) Prior Publication Data

US 2022/0075037 A1    Mar. 10, 2022

(30) Foreign Application Priority Data

Sep. 7, 2020  (JP) .................................. 2020-149923

(51) Int. Cl.
*G01S 7/4863* (2020.01)
*G01S 7/481* (2006.01)

(52) U.S. Cl.
CPC .......... *G01S 7/4863* (2013.01); *G01S 7/4816* (2013.01)

(58) Field of Classification Search
None
See application file for complete search history.

(56) References Cited

U.S. PATENT DOCUMENTS

| | | | |
|---|---|---|---|
| 10,324,171 B2 | 6/2019 | Niclass et al. | |
| 2010/0046802 A1 | 2/2010 | Watanabe et al. | |
| 2017/0242108 A1* | 8/2017 | Dussan ................ | G01S 7/4868 |
| 2017/0301716 A1 | 10/2017 | Irish et al. | |
| 2018/0061871 A1 | 3/2018 | Kokubun | |
| 2019/0011556 A1 | 1/2019 | Pacala et al. | |
| 2019/0018119 A1* | 1/2019 | Laifenfeld ............. | G01S 7/497 |
| 2019/0154815 A1 | 5/2019 | Oohata | |
| 2019/0154850 A1 | 5/2019 | Nishihara et al. | |
| 2020/0292675 A1 | 9/2020 | Kubota et al. | |
| 2020/0296313 A1 | 9/2020 | Nishino | |
| 2020/0300985 A1 | 9/2020 | Kubota et al. | |
| 2021/0011167 A1 | 1/2021 | Ishii et al. | |

(Continued)

FOREIGN PATENT DOCUMENTS

| | | |
|---|---|---|
| EP | 3709054 A1 | 9/2020 |
| JP | 2010-071976 A | 4/2010 |
| JP | 2018-013422 A | 1/2018 |

(Continued)

*Primary Examiner* — Luke D Ratcliffe
(74) *Attorney, Agent, or Firm* — Kim & Stewart LLP

(57) ABSTRACT

According to one embodiment, a light detector includes pixels arranged in first and second directions in a pixel area, and a control section. The control section is configured to turn on a first subset of the pixels in a first partial area based on first coordinate information, and to turn on a second subset of the pixels in a second partial area based on second coordinate information different from the first coordinate information. A first tilt of the first partial pixel area differs from a second tilt of the second partial pixel area.

14 Claims, 27 Drawing Sheets

(56) References Cited

U.S. PATENT DOCUMENTS

2021/0293957 A1   9/2021   Kubota et al.

FOREIGN PATENT DOCUMENTS

| | | |
|---|---|---|
| JP | 2018-032810 A | 3/2018 |
| JP | 2019-518200 A | 6/2019 |
| JP | 2020-526754 A | 8/2020 |
| JP | 2020-148644 A | 9/2020 |
| JP | 2020-153746 A | 9/2020 |
| JP | 2021-148477 A | 9/2021 |
| WO | 2018/003227 A1 | 1/2018 |
| WO | 2019/087783 A1 | 5/2019 |
| WO | 2019/186837 A1 | 10/2019 |

* cited by examiner

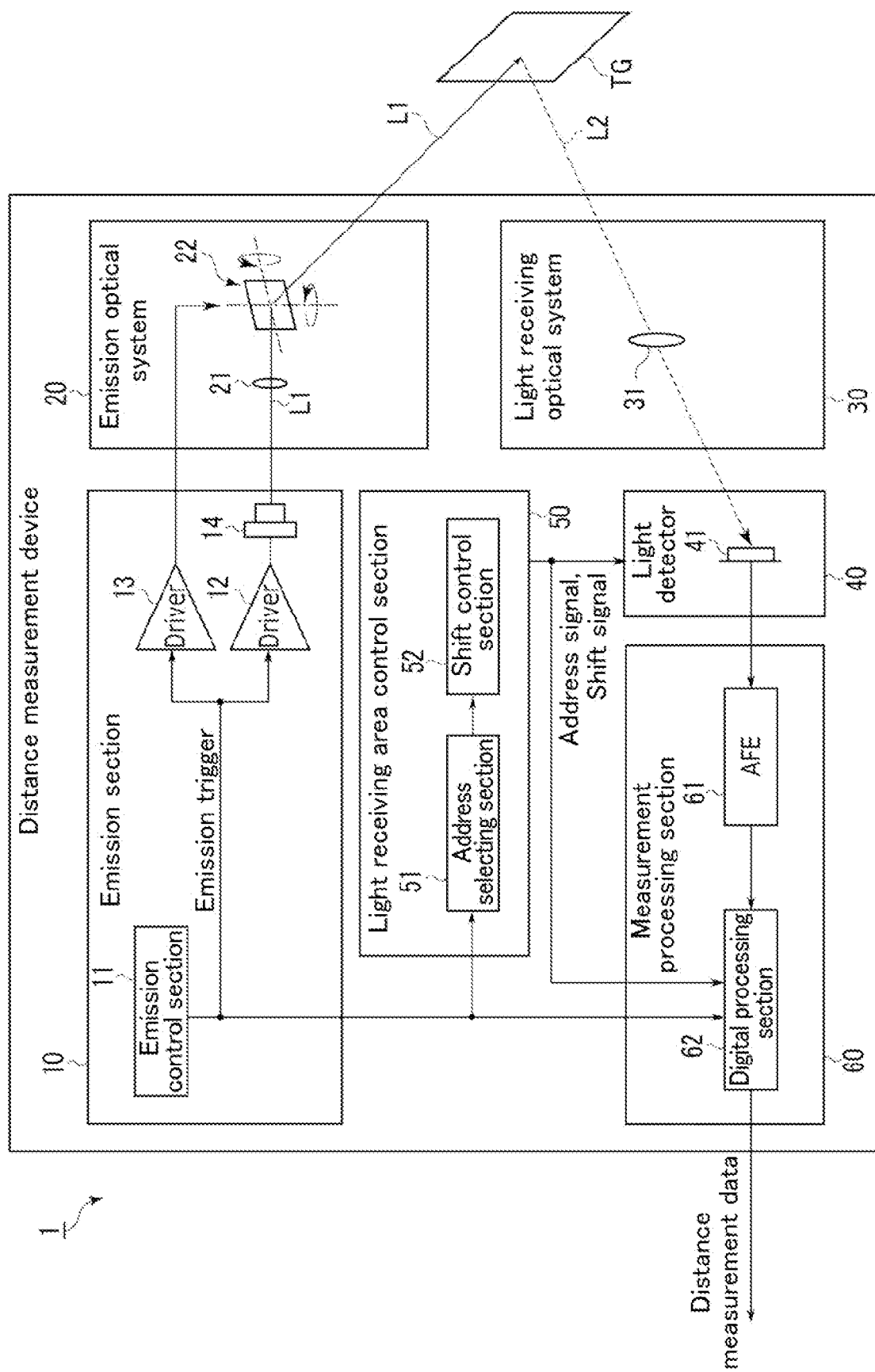
F I G. 1

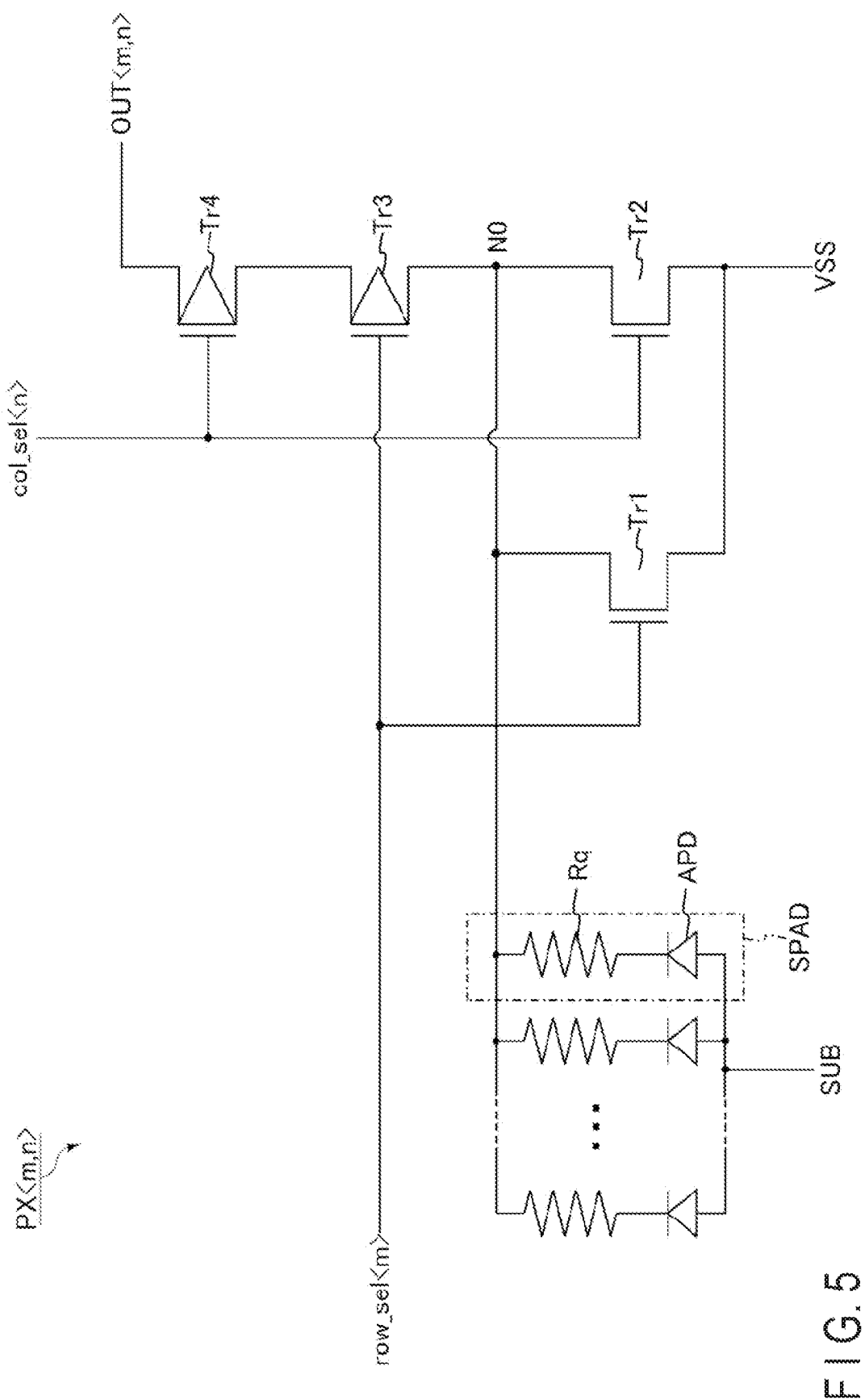
F I G. 5

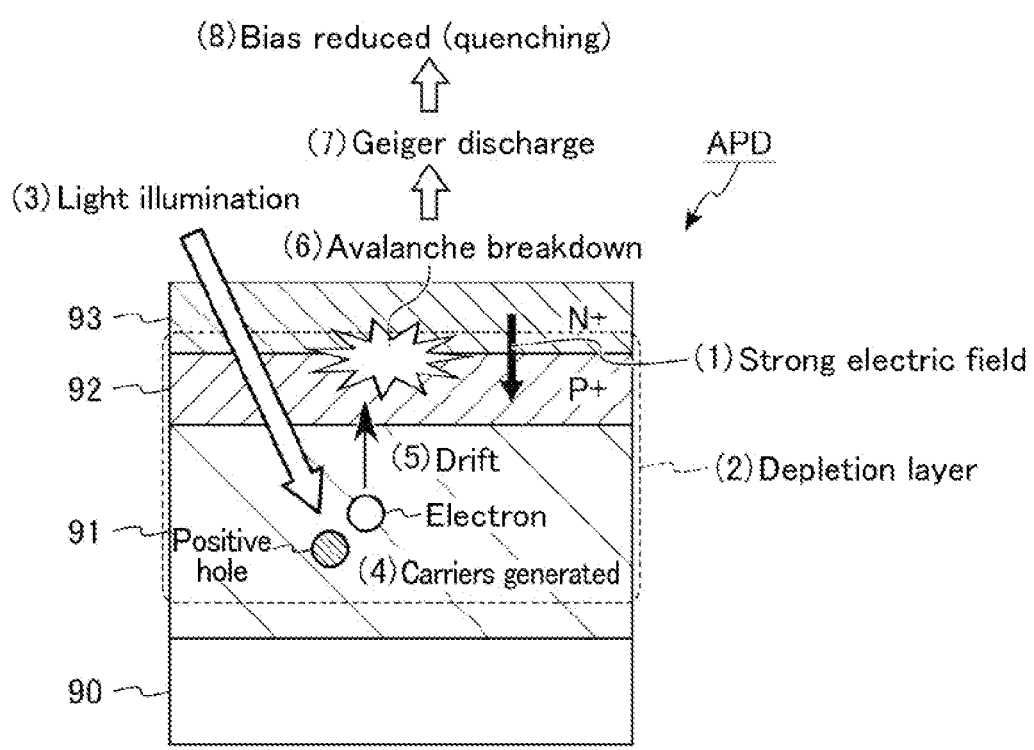
F I G. 6

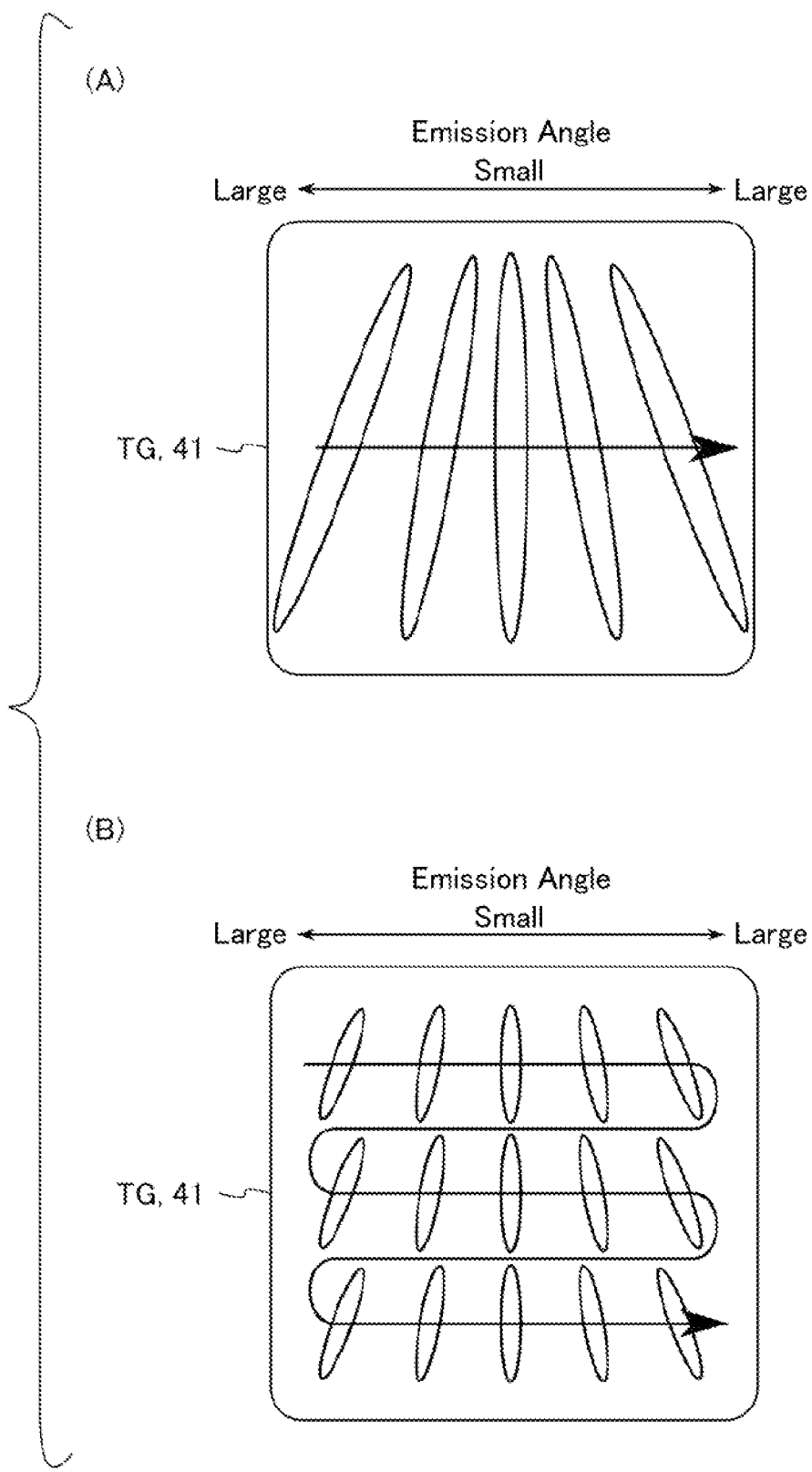
F I G. 7

| Column lower limit | Column upper limit | Shift direction | Offset | Shift interval |
|---|---|---|---|---|
| 0 | 4 | Left | 0 | 0 |
| 5 | 10 | Left | 1 | 1 |
| 11 | 16 | Left | 2 | 2 |
| ⋮ | ⋮ | ⋮ | ⋮ | ⋮ |
| N−10 | N+10 | — | — | — |
| ⋮ | ⋮ | ⋮ | ⋮ | ⋮ |
| 2N−16 | 2N−11 | Right | 2 | 2 |
| 2N−10 | 2N−5 | Right | 1 | 1 |
| 2N−4 | 2N | Right | 0 | 0 |

F I G. 9

| right_shift | left_shift | row_sel | Column shifting |
|---|---|---|---|
| False | False | Not-selected | None |
| True | False | Selected | Right |
| False | True | Selected | Left |
| True | True | Selected | None |

FIG. 13

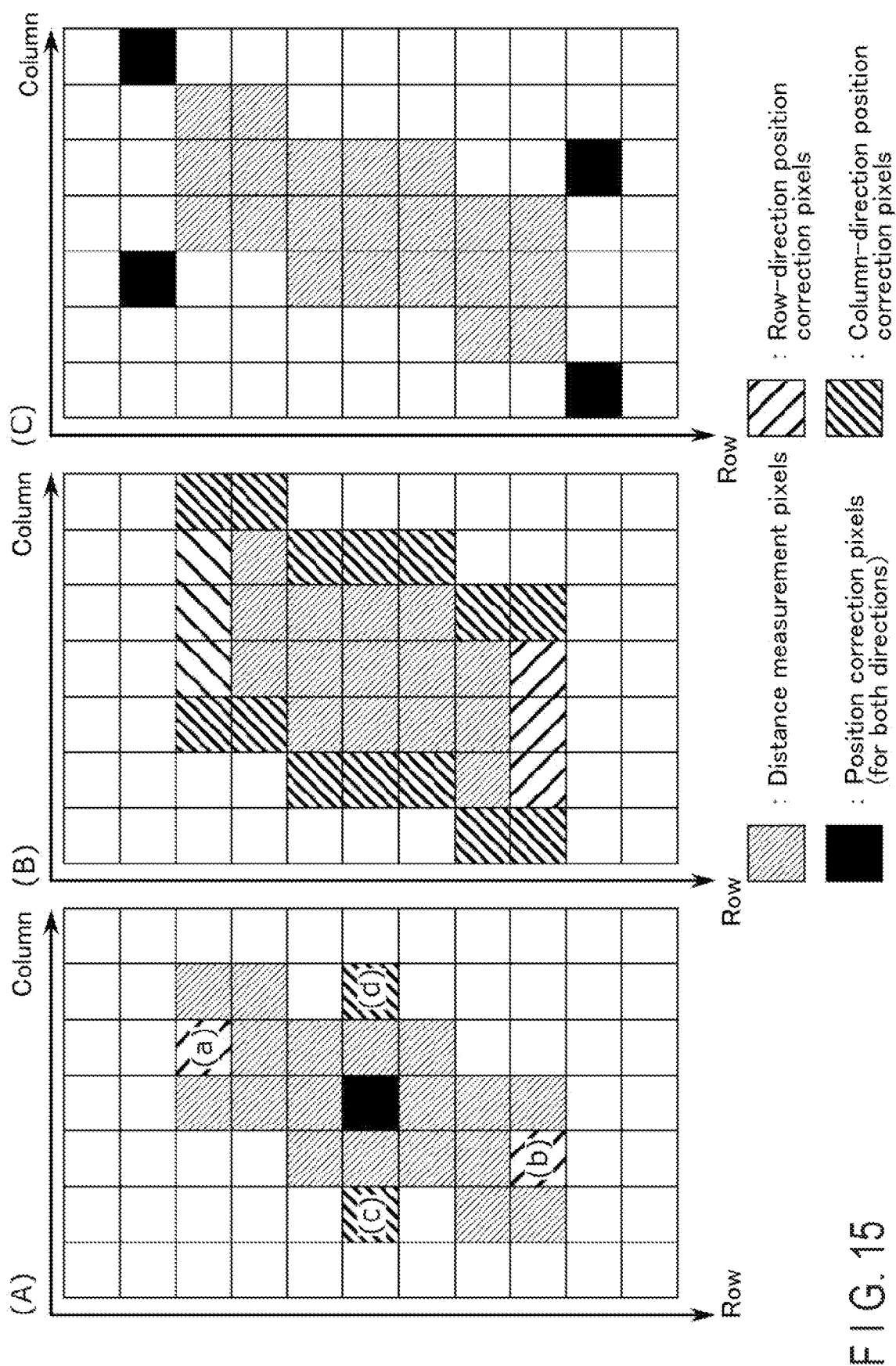
F I G. 15

F I G. 16

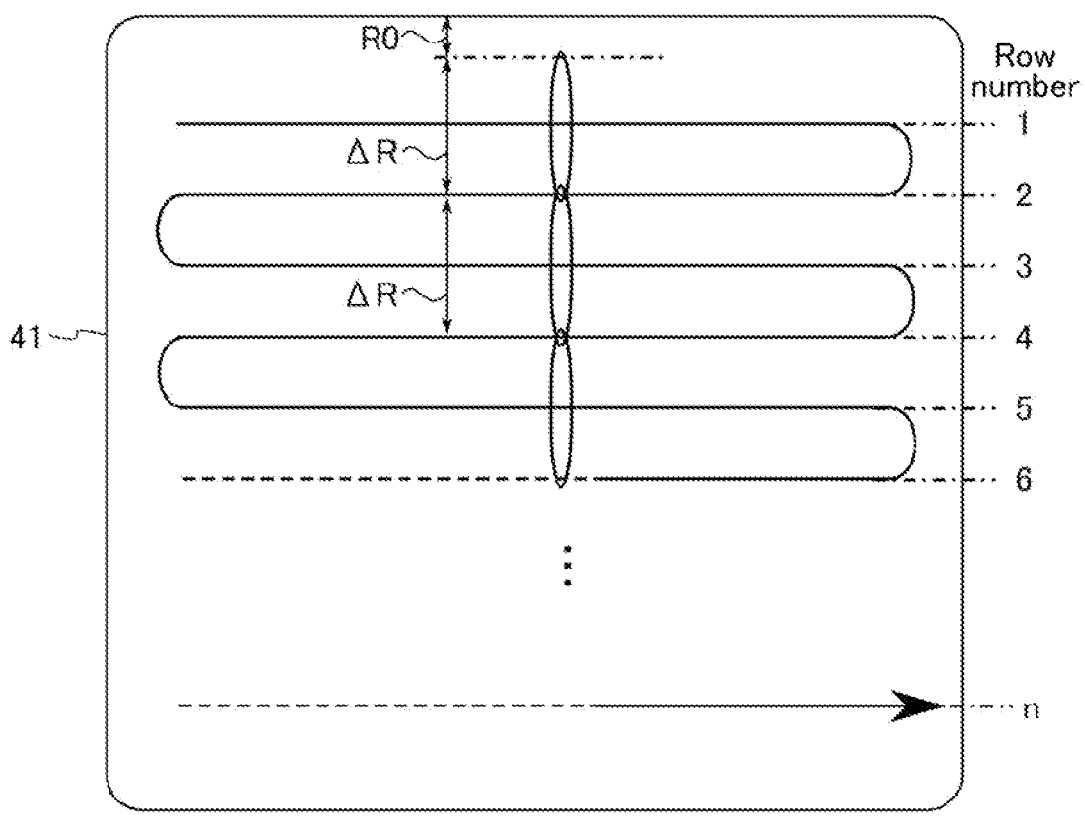
F I G. 18

| Output values of position correction pixels | | | | Direction of correction |
|---|---|---|---|---|
| Top right | Top left | Bottom right | Bottom left | |
| Small | Small | Small | Large | Lower pixels to the left |
| Small | Small | Large | Small | Lower pixels to the right |
| Small | Small | Large | Large | All pixels downward |
| Small | Large | Small | Small | Upper pixels to the left |
| Small | Large | Small | Large | All pixels to the left |
| Small | Large | Large | Small | Lower pixels to the right and upper pixels to the left |
| Small | Large | Large | Large | All pixels downward and upper pixels to the left |
| Large | Small | Small | Small | Upper pixels to the right |
| Large | Small | Small | Large | Lower pixels to the left and upper pixels to the right |
| Large | Small | Large | Small | All pixels to the right |
| Large | Small | Large | Large | All pixels downward and upper pixels to the right |
| Large | Large | Small | Small | All pixels upward |
| Large | Large | Small | Large | All pixels upward and lower pixels to the left |
| Large | Large | Large | Small | All pixels upward and lower pixels to the right |

F I G. 22

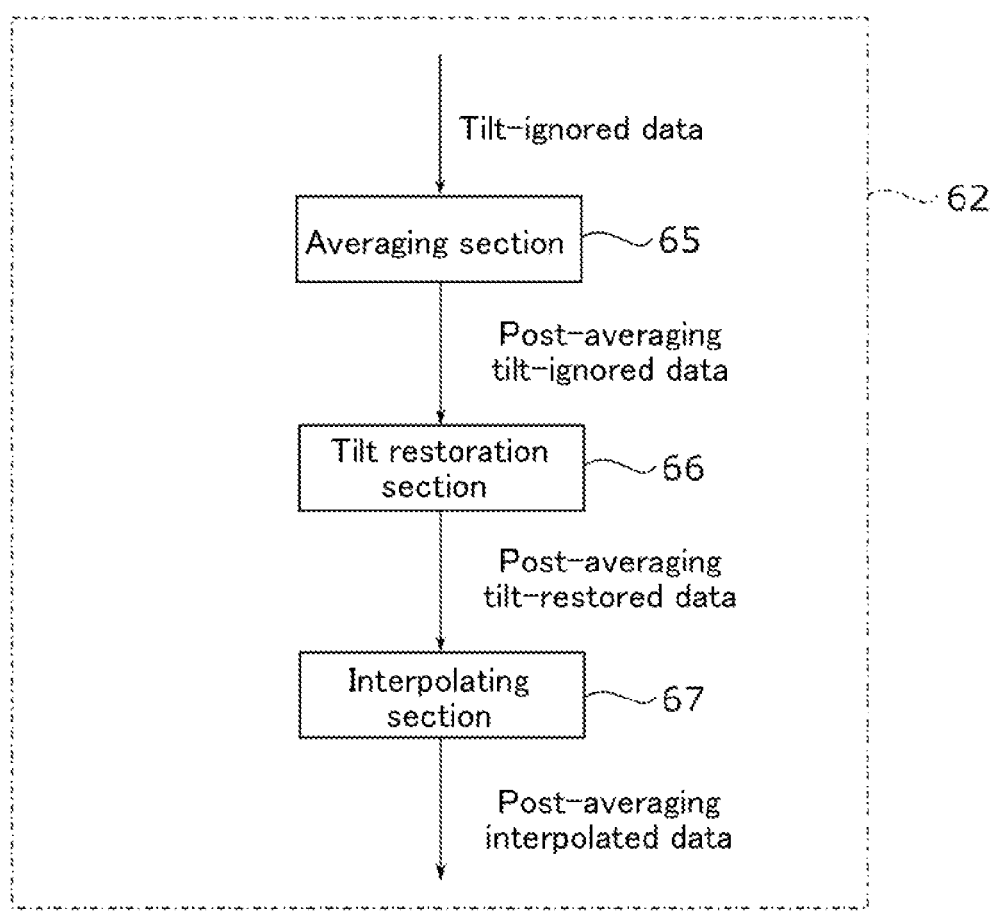
F I G. 23

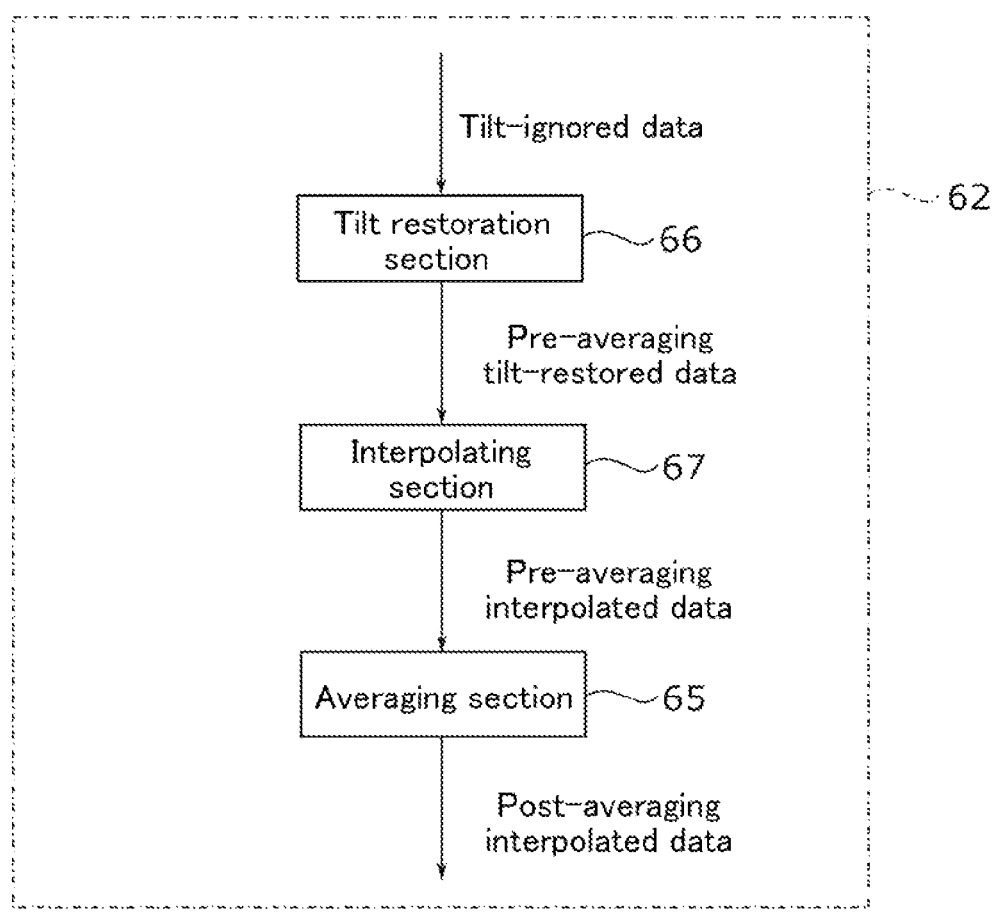
F I G. 26

US 12,259,499 B2

LIGHT DETECTOR AND DISTANCE MEASUREMENT DEVICE

CROSS-REFERENCE TO RELATED APPLICATIONS

This application is based upon and claims the benefit of priority from Japanese Patent Application No. 2020-149923, filed Sep. 7, 2020, the entire contents of which are incorporated herein by reference.

FIELD

Embodiments described herein relate generally to a light detector and a distance measurement device.

BACKGROUND

A distance measurement device called LiDAR (light detection and raging) is known. LiDAR illuminates a target with laser light and detects the strength of light reflected from the target with a sensor (light detector). LiDAR measures a distance to the target based on a change over time in a light intensity signal output from the sensor. Among various types of sensors used in LiDAR, a two-dimensional sensor (2D sensor) having a plurality of two-dimensionally arranged silicon photomultipliers is known as one of the most promising sensors.

BRIEF DESCRIPTION OF THE DRAWINGS

FIG. 1 is a block diagram for explaining a configuration of a distance measurement device according to a first embodiment.

FIG. 5 is circuit diagram showing a configuration of a pixel according to the first embodiment.

FIG. 6 is a schematic diagram showing a configuration example of an avalanche photodiode and an operation principle of an SPAD.

FIG. 7 is a schematic diagram for explaining the relationship between a light receiving area and a laser light scanning method in the distance measurement device according to the first embodiment.

FIG. 9 is a conceptual diagram for explaining a parameter table used in the light receiving area selection operation in the distance measurement device according to the first embodiment.

FIG. 13 is a conceptual diagram of a table showing the relationship between shift signals and row selection in the light detector according to the second embodiment.

FIG. 15 is a schematic diagram showing an arrangement of positional correction pixels with column shifting by the distance measurement device according to the third embodiment being taken into account.

FIG. 16 is a schematic diagram showing an arrangement of positional correction pixels without column shifting by the distance measurement device according to the third embodiment being taken into account.

FIG. 18 is a schematic diagram for explaining an example of a scan model in the distance measurement device according to the third embodiment.

FIG. 22 is a conceptual diagram of a table showing positional correction signals generated in the light receiving area selection operation in the distance measurement device according to the third embodiment.

FIG. 23 is a block diagram for explaining a configuration of a digital processing section of the distance measurement device according to a fourth embodiment.

FIG. 26 is a block diagram for explaining a configuration of a digital processing section of a distance measurement device according to a modification of the fourth embodiment.

DETAILED DESCRIPTION

Figure 2:
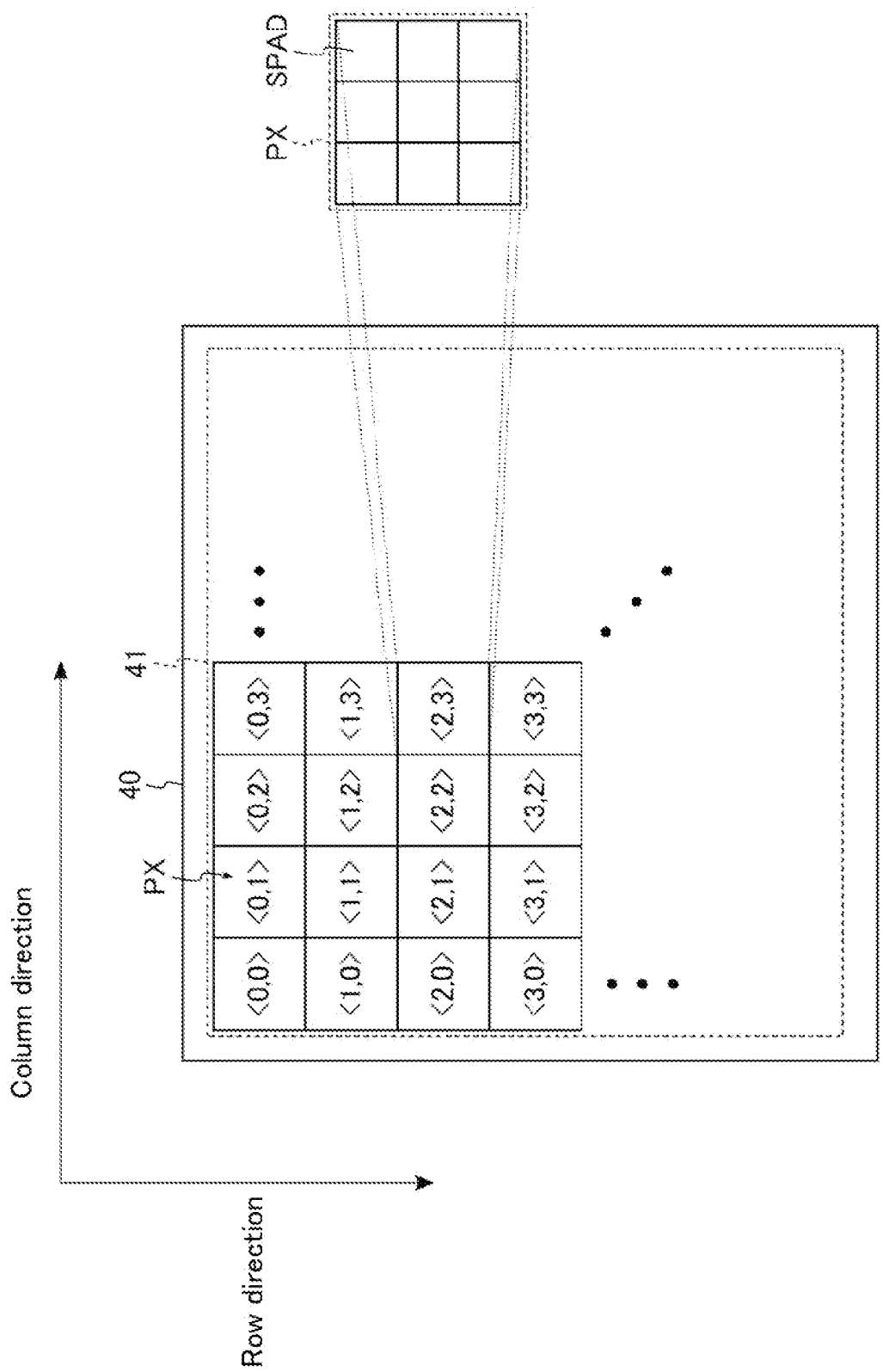
FIG. 2 is a plan view for explaining a planar layout of a light detector according to the first embodiment.

In general, according to one embodiment, a light detector includes a light detector includes a plurality of pixels two-dimensionally arranged in a first direction and a second direction intersecting each other in a pixel area on a substrate, and a control section. Each of the pixels includes at least one sensor. The control section is configured to: turn, to an on state, a first subset of the pixels corresponding to a first partial pixel area in the pixel area based on first coordinate information of the pixel area in the first direction;

and turn, to an on state, a second subset of the pixels corresponding to a second partial pixel area in the pixel area based on second coordinate information of the pixel area in the first direction. The second coordinate information is different from the first coordinate information. A first tilt of the first partial pixel area in the first direction with respect to the second direction differs from a second tilt of the second partial pixel area in the first direction with respect to the second direction.

Hereinafter, embodiments will be described with reference to the drawings. In the descriptions below, constituent elements having the same functions and configurations will be denoted by the same reference symbols. If there is a need for distinguishing constituent elements having the same reference numerals, additional symbols are appended to the reference numerals. If no distinction is necessary, the constituent elements are referred to by the same reference numerals only, and no additional symbols are appended.

1. First Embodiment

A light detector and a distance measurement device equipped with the light detector according to a first embodiment will be described. The distance measurement device according to the first embodiment is, for example, a LiDAR (light detection and ranging) device for measuring a distance to a target using laser light, and the light detector according to the first embodiment is, for example, a photon-multiplier that can be integrated on a semiconductor substrate, particularly a silicon photon-multiplier (SiPM).

1.1 Configuration

The distance measurement device equipped with the light detector according to the first embodiment will be described.

1.1.1 Distance Measurement Device

FIG. 1 is a block diagram for explaining a configuration of a distance measurement device according to the first embodiment.

As shown in FIG. 1, the distance measurement device 1 is configured to be capable of measuring a distance to a target TG. The distance measurement device 1 corresponds to a part of an on-board system (not shown), for example. The target TG is a tangible object, such as a vehicle, a pedestrian, or an obstacle that is present in front of, behind, or on the side of a vehicle on which the distance measurement device 1 is installed.

The distance measurement device 1 includes an emission section 10, an emission optical system 20, a light receiving optical system 30, a light detector 40, a light receiving area control section 50, and a measurement processing section 60.

The emission section 10 generates and emits laser light L1 used by the distance measurement device 1 to measure a distance to the target TG. The emission section 10 includes, for example, an emission control section 11, drivers 12 and 13, and a light source 14.

The emission control section 11 generates an emission trigger based on, for example, a clock which serves as a reference for operations performed by the distance measurement device 1. The emission trigger includes a pulse signal corresponding to an emission timing of the laser light L1 sent out to the target TG by the distance measurement device 1, and the trigger is transmitted to, for example, the drivers 12 and 13, the light receiving area control section 50, and the measurement processing section 60. The emission trigger may be associated with a scan position (described later) through a clock.

The driver 12 generates a drive current in accordance with the emission trigger from the emission control section 11 and supplies the generated drive current to the light source 14. In other words, the driver 12 functions as a current supply source for the light source 14.

The driver 13 generates a drive current in accordance with the emission trigger from the emission control section 11 and supplies the generated drive current to the mirror 22 in the emission optical system 20. In other words, the driver 13 functions as a current supply source for the mirror 22.

The light source 14 is a laser light source, such as a laser diode. The light source 14 intermittently produces (emits) the laser light L1 based on the drive current supplied from the driver 12. The laser light L1 is emitted on the target TG via the emission optical system 20, which is described later.

The emission optical system 20 emits the laser light L1 entered from the light source 14 on the target TG. The emission optical system 20 includes a lens 21 and a mirror 22, for example.

The lens 21 is arranged on a light path of the laser light L1 emitted from the light source 14. The lens 21 collimates the laser light L1 passing through the lens 21 and guides the laser light L1 to the mirror 22.

The mirror 22 is driven on a supply of a drive current from the driver 13 and reflects the incident laser light L1 entering from the lens 21. For example, the reflection surface of the mirror 22 is configured to be rotatable about a single axis or two intersecting axes. The laser light L1 reflected by the mirror 22 is emitted outside the distance measurement device 1 toward the target TG.

The light receiving optical system 30 includes a lens 31, for example.

The lens 31 collects light reflected by the target TG and guides the collected reflected light to the light detector 40. In other words, the lens 31 collects, for the light detector 40, external light including reflected light (laser light) L2, which is the reflection of the laser light L1 emitted from the distance measurement device 1.

The laser light L1 and L2 respectively form light paths between the distance measurement device 1 and the target TG. In other words, the distance measurement device 1 has a non-coaxial optical system whereby the laser light L1 emitted from the light emission section 10 and the laser light L2 received by the light detector 40 have different optical axes.

The light detector 40 includes a light receiving section 41 in which a plurality of pixels are arranged in a pixel area of a two-dimensional array defined by rows and columns. The light detector 40 selects, for each emission trigger, a portion of the pixels in the light receiving section 41 as a light receiving area based on an address signal and a shift signal received from the light receiving area control section 50.

The light receiving section 41 receives the reflected incident light L2 via the lens 31. Then, the light receiving section 41 generates electrical signals (analog signals) based on the intensity of the received reflected light L2 and outputs the analog signals to the measurement processing section 60 in units of pixels. The details of the light detector 40 will be described later.

The light receiving area control section 50 controls which light receiving area should be selected (should be turned on) when the light receiving section 41 receives the reflected light L2. The light receiving area control section 50 includes an address selecting section 51 and a shift control section 52, for example.

The address selecting section 51 generates an address signal that includes an address corresponding to the light receiving area of the light receiving section 41 based on an emission trigger received from the emission control section 11 or a signal that can be associated with an emission trigger. The address signal can identify a group of pixels in the plurality of pixels arranged in the light receiving section 41 and includes one or more row addresses and one column address. The address selecting section 51 transmits an address signal that includes a determined address to the shift control section 52.

The shift control section 52 generates a shift signal that includes information defining a tilt of the light receiving area in the light receiving section 41 based on the address signal received from the address selecting section 51 and a pre-stored parameter table. Thereafter, a set of the address signal generated by the address selecting section 51 and the shift signal generated by the shift control section 52 is transmitted to the light detector 40 and the measurement processing section 60. The details of the parameter table will be described later.

The measurement processing section 60 converts the analog signals received in units of pixels from the light detector 40 into digital signals, then measures a distance between the distance measurement device 1 and the target TG based on the digital signals. Specifically, the measurement processing section 60 includes an analog front end (AFE) 61 and a digital processing section 62, for example.

The AFE 61 includes a trans-impedance amplifier (TIA), an analog-to-digital convertor (ADC), and a time-to-digital convertor (TDC), for example. The AFE 61 amplifies the analog signals input from the light detector 40, then converts the amplified analog signals into digital signals. The AFE 61 transmits the generated digital signals to the digital processing section 62.

The digital processing section 62 obtains an emission timing of the laser light L1 based on the emission trigger received from the emission control section 11, and an incidence timing of the reflected light L2 based on the digital signals received from the AFE 61. The digital processing section 62 calculates a time of flight of the laser light L1 and the reflected light L2 based on the above emission timing and incidence timing. The digital processing section 62 then measures a distance between the distance measurement device 1 and the target TG based on the time of flight and velocity of the laser light. The incidence timing of the reflected light L2 can be determined based on either a time at which digital signals rise or a digital signal peak time. Such a distance measuring method may be called a time of flight (ToF) method.

The digital processing section 62 transmits the measured distance measurement data to an image processing circuit (not shown) of a subsequent stage. The image processing circuit of a subsequent stage generates, based on the distance measurement data, image data in which distance information is mapped over a region targeted for the measurement by the distance measurement device 1, for example. The generated image data is referred to by a control program of a vehicle, etc. equipped with the distance measurement device 1, for example.

With such a configuration, the distance measurement device 1 can measure a distance to a target TG in a non-coaxial optical system.

1.1.2 Light Detector

Next, a configuration of the light detector according to the first embodiment will be described.

(Planar Layout)

FIG. 2 is an example of a planar layout of the light detector according to the first embodiment.

As shown in FIG. 2, for example, on a semiconductor substrate the light receiving section 41 includes a plurality of pixels PX arranged in a two-dimensional array extending in the row and column directions. The plurality of pixels PX are arranged in such a manner that each of their positions is identifiable by a column address associated with the column direction and a row address associated with the row direction.

In the example shown in FIG. 2, in the light receiving section 41, the pixel PX, which is the i-th on the row direction and the j-th on the column direction, is indicated as pixel PX<i,j> ($0 \le i \le M$, $0 \le j \le N$, and M and N are discretionarily determined integers). For example, of the plurality of pixels PX, the number of pixels arranged in the column direction, N, is greater than the number of the pixels arranged in the row direction, M (i.e., N>M). In the following, for the purposes of description, assume that a plurality of pixels PX<i> at the i-th order along the row direction correspond to a row address <i>, and a plurality of pixels PX<j> at the j-th order along the column direction correspond to a column address <j>.

Each of the pixels PX includes at least one photomultiplier element. As a photomultiplier element, a single-photon avalanche diode may be used for example. Hereinafter, a single-photon avalanche diode may be abbreviated as "SPAD". The details of the function of the SPAD will be described later. If multiple SPADs are provided in a pixel PX, the multiple SPADs are arranged within the pixel PX in a two-dimensional array extending in the row and column directions, for example. The pixel PX that includes multiple SPADs may be called a "silicon photomultiplier (SiPM)".

The number of pixels PX and the number of SPADs included in the light detector 40 are not limited to those shown in FIG. 2, and the numbers can be discretionarily determined. The planar shape of each of the pixel PX and the SPAD may not necessarily be a square. The shape of the pixel PX may vary in accordance with the shape and arrangement of the SPADs included in each pixel PX. For example, in each pixel PX, the number of SPADs arranged in the row direction and the number of SPADs arranged in the column direction may differ from each other. The light detector 40 may use pixels PX in different shapes. A SPAD may be in a shape other than that shown in FIG. 2, for example a rectangle.

(Circuit Configuration of Light Detector)

Next, a circuit configuration of the light detector according to the first embodiment will be described.

Figure 3:
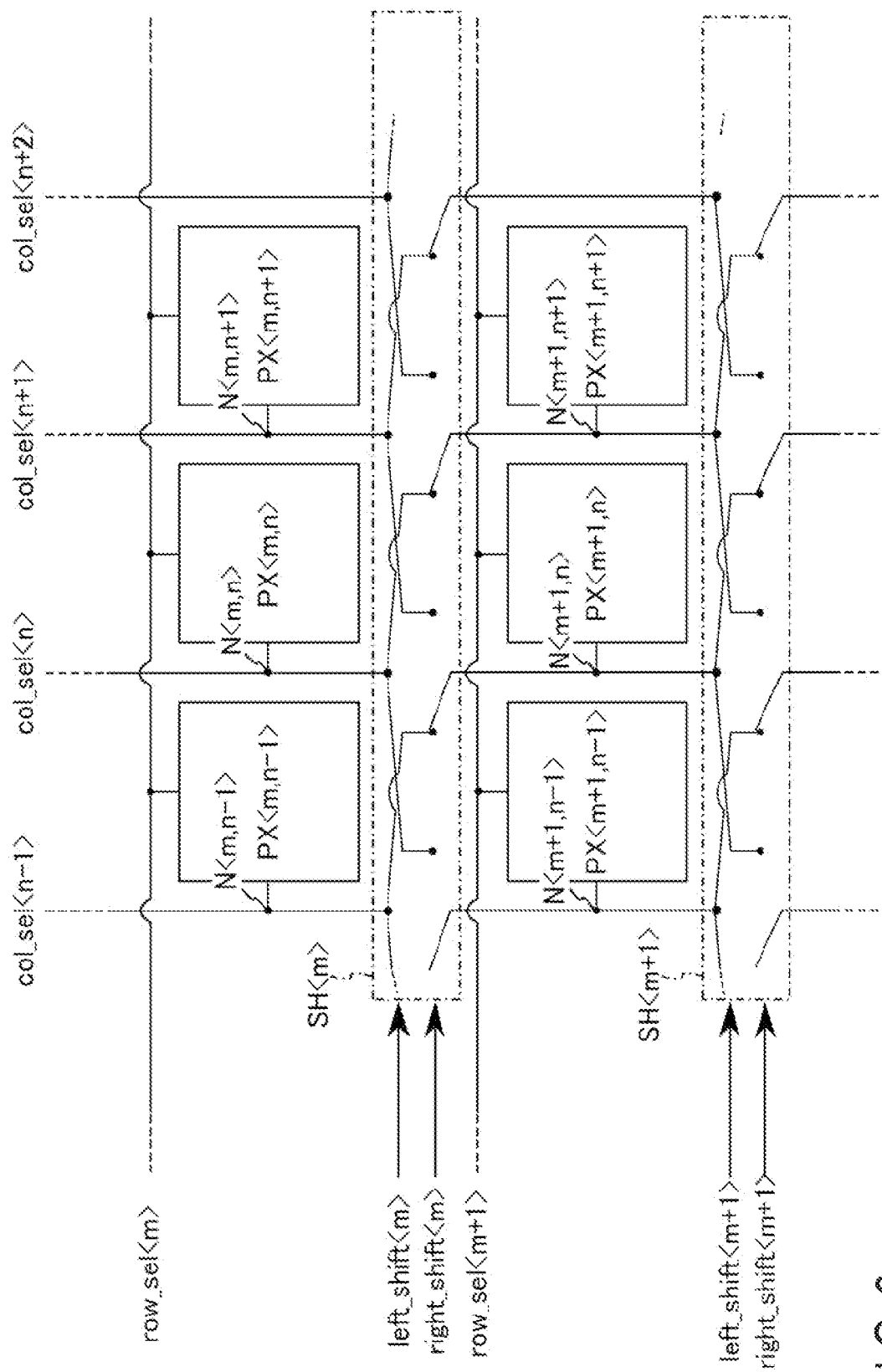
FIG. 3 is a circuit diagram for explaining a configuration of the light detector according to the first embodiment.

FIG. 3 is a circuit diagram showing the configuration of the light detector according to the first embodiment. FIG. 3 shows six pixels in the light receiving section 41, PX<m, n−1>, PX<m,n>, PX<m,n+1>, PX<m+1,n−1>, PX<m+1, n>, and PX<m+1,n+1>, and a group of select lines that may be coupled to the six pixels PX ($0 \le m \le M-1$, $1 \le n \le N-2$).

As shown in FIG. 3, all pixels PX are associated with respective sets of a row select line row_sel and a column select line col_sel. In other words, a first end and a second end of a discretionarily chosen pixel PX are coupled to a corresponding row select line row_sel and a corresponding column select line col_sel, respectively. Thus, a specific pixel PX can be selected through selection of a set of a row select line row_sel and a column select line col_sel.

Specifically, the first ends of the pixels PX<m> ( . . . , PX<m,n−1>, PX<m,n>, PX<m,n+1>, . . . ) corresponding to the row address <m> are coupled in common to the row select line row_sel<m>. Similarly, the first ends of the pixels PX<m+1> ( . . . , PX<m+1,n−1>, PX<m+1,n>, PX<m+1, n+1>, . . . ) corresponding to the row address <m+1> are coupled in common to the row select line row_sel<m+1>.

A shift circuit SH<m> is provided between the second ends of the pixels PX<m> and the second ends of the pixels PX<m+1>. The shift circuit SH<m> has a function of shifting the column select line col_sel coupled to each of the pixels PX<m+1> in the column direction, with respect to the column select line col_sel coupled to each of the pixels PX<m>. Specifically, the node N<m,n> coupled to the second end of the pixel PX<m,n> can be connected, via the shift circuit SH<m>, to any one item selected from the following: the node N<m+1,n−1> coupled to the second end of the pixel PX<m+1,n−1>; the node N<m+1,n> coupled to the second end of the pixel PX<m+1,n>; and the node N<m+1,n+1> coupled to the second end of the pixel PX<m+1,n+1>.

In the following, for the purposes of description, a situation where the node N<m,n> is coupled to the node N<m+1,n−1> will be described as "the shift circuit SH<m> shifts the column select line col_sel in a leftward direction". A situation where the node N<m,n> is coupled to the node N<m+1,n> will be described as "the shift circuit SH<m> does not shift the column select line col_sel". A situation where the node N<m,n> is coupled to the node N<m+1,n+1> will be described as "the shift circuit SH<m> shifts the column select line col_sel in a rightward direction".

In the following, a state in which the shift circuit SH shifts the column select line col_sel in a leftward or rightward direction will be referred to as an "on state", and a state in which the shift circuit SH does not shift the column select line col_sel will be referred to as an "off state".

The shift circuit SH<m> is configured to shift all the column select lines col_sel in a rightward direction, to shift in a leftward direction, or to not shift at all. Specifically, the shift circuit SH<m> is configured to shift all the column select lines col_sel between the pixel PX<m> and the PX<m+1> in the leftward direction upon receipt of the activated signal left_shift<m> and not-activated signal right_shift<m>. The shift circuit SH<m> is configured to shift all the column select lines col_sel between the pixel PX<m> and the pixel PX<m+1> in the rightward direction upon receipt of the not-activated signal left_shift<m> and the activated signal right_shift<m>. The shift circuit SH<m> is configured to not shift all the column select lines col_sel between the pixel PX<m> and the pixel PX<m+1> upon receipt of the not-activated signals left_shift<m> and right_shift<m>, or upon receipt of the activated signals left_shift<m> and right_shift<m>.

The activated state of a signal means an inverted logic of a state where a signal is not being activated. In other words, if an activated signal is at an "H" level, a non-activated signal is at an "L" level; if an activated signal is at an "L" level, a non-activated signal is at an "H" level.

Thus, with the shift circuits SH being provided between the pixels PX arranged in the row direction, different pixels PX having different column addresses can be coupled in common to a single column select line col_sel.

Figure 4:
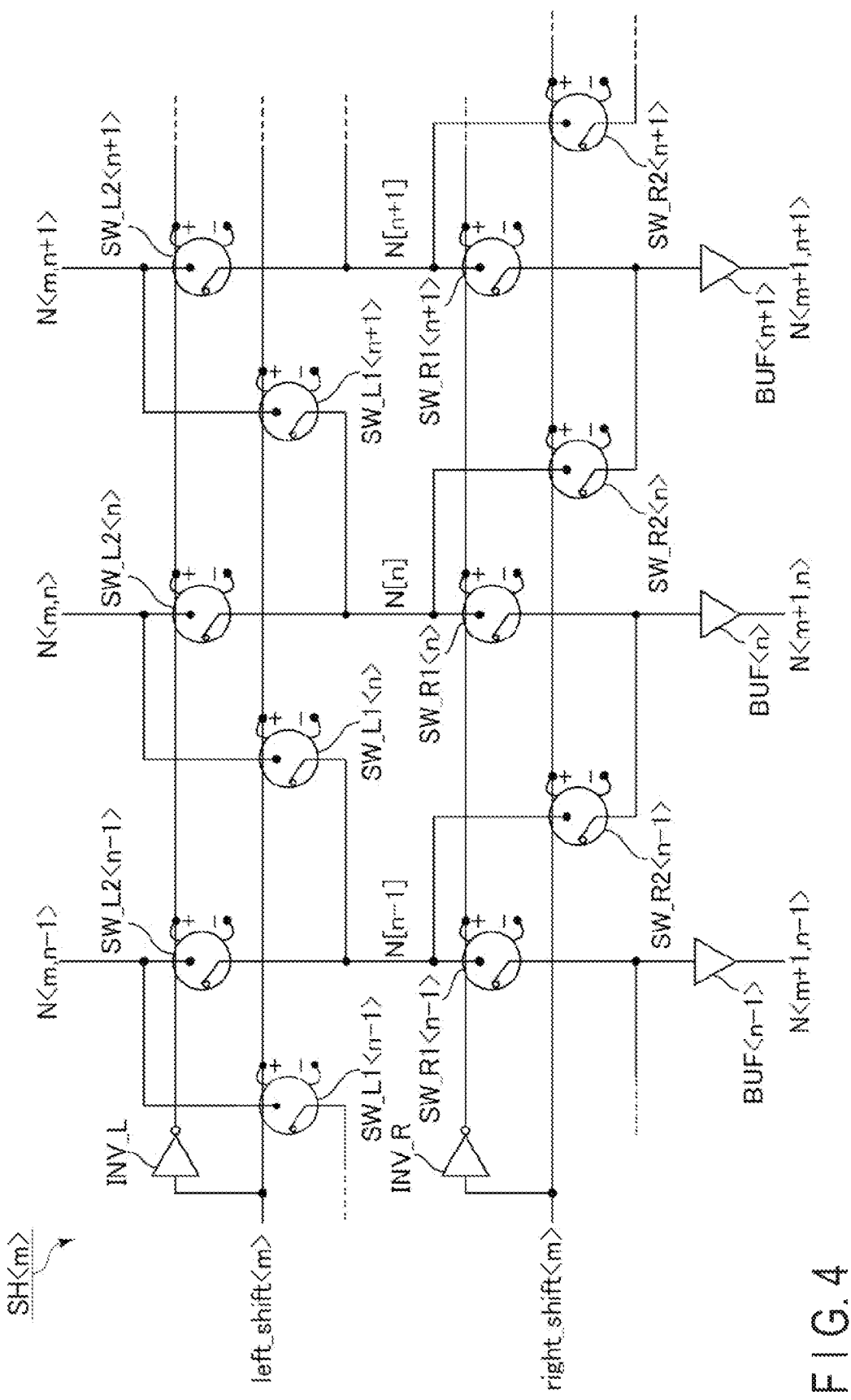
FIG. 4 is circuit diagram for explaining a configuration of a shift circuit according to the first embodiment.

FIG. 4 is a circuit diagram showing the configuration of the shift circuit according to the first embodiment. FIG. 4 shows a specific circuit configuration of a part of the shift circuit SH<m> shown in FIG. 3. In the following, for the purposes of description, the configuration of the part of the shift circuit SH<m> related to the coupling between the nodes N<m,n>, N<m+1,n−1>, N<m+1,n>, and N<m+1,n+1> will be mainly described.

As shown in FIG. 4, the shift circuit SH<m> includes switching elements SW_L1<n>, SW_L2<n>, SW_R1<n−1>, SW_R1<n>, SW_R2<n−1>, and SW_R2<n>, inverters INV_L and INV_R, and buffers BUF<n−1>, BUF<n>, and BUF<n+1>.

Each of the switching elements SW_L1, SW_L2, SW_R1, and SW_R2 is a metal oxide semiconductor (MOS) transistor formed on a semiconductor substrate for example; however, any types of switching elements can be adopted. If the MOS transistors are used, each of the switching elements SW_L1, SW_L2, SW_R1, and SW_R2 may be a p-type MOS transistor, an n-type MOS transistor, or a CMOS (complementary MOS) transistor (transfer gate).

The inverter INV_L includes an input end to which a signal left_shift<m> is supplied, and an output end that outputs an inverted signal of the signal left_shift<m>. The switching element SW_L1<n> includes a first end coupled to the node N<m,n>, a second element coupled to the node N[n−1], and a control end to which the signal left_shift<m> is supplied. The switching element SW_L2<n> includes a first end coupled to the node N<m,n>, a second element coupled to the node N[n], and a control end coupled to the output end of the inverter INV_L.

The inverter INV_R includes an input end to which the signal right_shift<m> and an output end that outputs an inverted signal of the signal right_shift<m>. The switching element SW_R1<n−1> includes a first end coupled to the node N[n−1], a second end coupled to the input end of the buffer BUF<n−1>, and a control end coupled to the output end of the inverter INV_R. The switching element SW_R2<n−1> includes a first end coupled to the node N[n−1], a second element coupled to the input end of the buffer BUF<n>, and a control end to which the signal right_shift<m> is supplied.

The switching element SW_R1<n> includes a first end coupled to the node [n], a second element coupled to the buffer BUF<n>, and a control end coupled to the output end of the inverter INV_R. The switching element SW_R2<n> includes a first end coupled to the node N[n], a second element coupled to the input end of the buffer BUF<n+1>, and a control end to which the signal right_shift<m> is supplied.

The buffer BUF<n−1> includes the output end coupled to the node N<m+1,n−1>. The buffer BUF<n> includes an output end coupled to the node N<m+1,n>. The buffer BUF<n+1> includes an output end coupled to the node N<m+1,n+1>.

With the above-described configuration, the shift circuit SH<m> shown in FIG. 3 is realized.

The buffers BUF have a function of compensating any voltage drop that occurs in a signal supplied to the column select line col_sel caused by the signal's being transmitted via the switching elements SW_L1, SW_L2, SW_R1, and SW_R2. For this reason, other than the buffers BUF, any circuit having the above-described functions can be adopted. For example, an inverter may be provided instead of a buffer BUF.

If an inverter is provided instead of a buffer BUF, the signal supplied to the column select line col_sel is inverted every time the signal passes the shift circuit SH. For this reason, the circuit is configured in such a manner that the polarity of the signal supplied to the column select line col_sel at the time of selection is inverted: that is, a positive signal is supplied if the targeted pixels PX have the even-numbered row address, and a negative signal is supplied if the targeted pixels PX have the odd-numbered row address, and vice versa.

(Circuit Configuration of Light Receptor)

Next, a circuit configuration of the light receptor according to the first embodiment will be described.

FIG. 5 shows an example of a circuit configuration of the pixels of the light receptor according to the first embodiment. FIG. 5 shows a circuit configuration of the pixel PX<m,n> as an example.

As shown in FIG. 5, a pixel PX<m,n> includes a plurality of SPADs and transistors Tr1, Tr2, Tr3, and Tr4, for example. Each of the SPADs includes an avalanche photodiode APD and a quench resistor Rq. For example, the transistors Tr1 and Tr2 are n-type MOS transistors, and the transistors Tr3 and Tr4 are p-type MOS transistors.

The plurality of SPADs are coupled in parallel between a high-potential node NO and a low-potential power supply node SUB. Furthermore, for each of the SPADs, the avalanche photodiode APD and the quench resistor Rq are coupled in series between a high-potential node NO and a low-potential power supply node SUB. Specifically, the anode of the avalanche photodiode APD is coupled to the low-potential power supply node SUB. The cathode of the avalanche photodiode APD is coupled to one end of the quench resistor Rq. The other end of the quench resistor Rq is coupled to the high-potential node NO.

In the distance measurement operation in the distance measurement device 1, the potential of the high-potential node NO is higher than the voltage applied to the low-potential power supply node SUB. In other words, a reverse bias is applied to the avalanche photodiodes APD in the distance measurement operation. The high-potential node NO corresponds to the output end of a light detection result obtained by the avalanche photodiodes APD included in the SPADs.

The transistor Tr1 includes a first end coupled to the node NO, a second end to which a voltage VSS is supplied, and a control end coupled to the row select line row_sel<m>. The transistor Tr2 includes a first end coupled to the node NO, a second end to which a voltage VSS is supplied, and a control end coupled to the column select line col_sel<n>. The voltage VSS is a voltage lower than the high-potential node NO and higher than the low-potential node SUB, for example −5 V. This voltage value is only an example, and the voltage VSS may be a ground voltage, for example 0 V.

The transistor Tr3 includes a first end coupled to the node NO, a second end coupled to a first end of the transistor Tr4, and a control end coupled to the row select line row_sel<m>. The transistor Tr4 includes a second end coupled to the output node OUT<m,n> and a control end coupled to the column select line col_sel<n>.

With the above-described configuration, if both of the row select line row_sel<m> and the column select line col_sel<n> are selected, an output signal IOUT corresponding to a light detection result in multiple SPADs included in the pixel PX<m,n> can be output to the output node OUT<m,n>. If at least one of the row select line row_sel<m> or the column select line col_sel is not selected, an output signal IOUT is not output to the output node OUT<m,n> and instead discarded.

The circuit configuration of the pixel PX is not limited to the above-described configuration. For example, the quench resistor Rq may be replaced with a transistor. A transistor for quenching may be further coupled to the high-potential node NO. The transistors Tr1 through Tr4 may be replaced with other switching elements as long as they can selectively output an output signal IOUT. The pixel PX may be constituted by SPADs of active quenching that include transistors used for recovery. If an SPAD is an active quench, the output would normally be a digital signal; however, the row select line row_sel<m> and the column select line col_sel<n> may be respectively coupled to one of the two inputs of the NAND gate coupled to the output.

1.1.3 SPAD

In the following, an example of the configuration of the avalanche photodiode APD and an operation principle of the SPAD will be described with reference to FIG. 6. FIG. 6 schematically shows a configuration example of the avalanche photodiode APD and an operation principle of the SPAD.

First, the configuration of the avalanche photodiodes comprising APD is described. The avalanche photodiode APD includes, for example, a substrate 90, a p-type semiconductor layer 91, a $p^+$-type semiconductor layer 92, and an $n^+$-type semiconductor layer 93.

The substrate 90 is a p-type semiconductor substrate, for example. On the substrate 90, the p-type semiconductor layer 91, the $p^+$-type semiconductor layer 92, and the $n^+$-type semiconductor layer 93 are stacked in this order. The concentration of the p-type impurities in the $p^+$-type semiconductor layer 92 is higher than that of the p-type impurities in the p-type semiconductor layer 91. The $n^+$-type semiconductor layer 93 is a semiconductor doped with the n-type impurities. For example, on the $n^+$-type semiconductor layer 93, an electrode (not shown) is coupled.

Next, an operation principle of the SPAD is described. In the distance measurement device 1 according to the first embodiment, the substrate 90 side corresponds to the low-potential power supply node SUB, and the $n^+$-type semiconductor layer 93 corresponds to the high-potential side (cathode).

In the distance measurement operation of the distance measurement device 1, a negative high voltage is applied to the substrate 90 side of the avalanche photodiodes APD. In other words, a high reverse bias is applied to the avalanche photodiode APD and a strong electric field is produced between the $p^+$-type semiconductor layer 92 and the $n^+$-type semiconductor layer 93 ((1) of FIG. 6). Then, in the vicinity of the junction between the $p^+$-type semiconductor layer 92 and the $n^+$-type semiconductor layer 93 (namely p-n junction) area, a depletion layer is formed (as shown in (2) of FIG. 6). In the distance measurement operation, the avalanche photodiode APD in this status is, in turn, in a state in which the APD is capable of detecting optical signals.

Then, the avalanche photodiode APD is illuminated with light and optical energy partially arrives to the depletion layer ((3) of FIG. 6). When the depletion layer is illuminated with light, pairs of an electron and a positive hole, namely carriers, may be generated in the depletion layer ((4) of FIG. 6). The carriers generated in the depletion layer drift under the influence of the electric field of the reverse bias applied to the avalanche photodiode APD ((5) of FIG. 6). For example, the positive holes of the generated carriers are accelerated toward the substrate 90 side. The electrons of the generated carriers on the other hand are accelerated toward the $n^+$-type semiconductor layer 93.

The electrons accelerated toward the $n^+$-type semiconductor layer 93 collide with the atoms under the influence of the strong electric field produced in the vicinity of the p-n junction. Then, the electrons colliding with the atoms ionize those atoms and generate new electron/positive hole pairings. If the voltage of the reverse bias applied to the avalanche photodiodes APD exceeds a breakdown voltage of the avalanche photodiodes APD, generation of electron/positive hole pairs is repeated. This phenomenon is called "avalanche breakdown" ((6) of FIG. 6).

When avalanche breakdown occurs, the avalanche photodiodes APD discharge the electricity ((7) of FIG. 6). In the case of SPADs, the discharge does not stop unless any countermeasure is taken. Such discharge is called "Geiger discharge". When Geiger discharge occurs, a current flows through the output node of the SPAD. As a result, electrical signals related to the Geiger discharge and recovery thereafter are output from the avalanche photodiode APD, namely one SPAD.

The current output from the avalanche photodiode APD flows in the quench resistor Rq, for example. As a result, the voltage drop occurs in the output node of the SPAD ((8) of FIG. 6). Such a voltage drop in an SPAD is called "quenching". When the voltage of the reverse bias applied to the avalanche photodiodes APD becomes lower than the breakdown voltage due to the voltage drop, the Geiger discharge ends. Following that, the capacity in the p-n junction in each avalanche photodiode APD is charged and a recovery current subsequently flows (the avalanche phenomenon). The avalanche phenomenon then stops, and after the elapse of a certain period of time, the avalanche photodiode APD returns to a state of being able to detect the subsequent light.

Thus, the light receiving section 41 of the distance measurement device 1 according to the first embodiment contains avalanche photodiodes APD used in a Geiger mode. These avalanche photodiodes APD experience avalanche breakdown in accordance with incidence of light, and output electrical signals corresponding to a light detection result. It is thereby possible for the light receiving section 41 to detect receipt of light in units of photons and convert the light into electrical signals.

The structure of the avalanche photodiodes APD used in an SPAD unit SU is not limited to that described in the above. For example, the $p^+$-type semiconductor layer 92 may be omitted. The thickness of each of the p-type semiconductor layer 91, the $p^+$-type semiconductor layer 92, and the $n^+$-type semiconductor layer 93 may be changed as appropriate. The p-n junction of each avalanche photodiode APD may be formed in the vicinity of the boundary to the substrate 90. In the structure of each avalanche photodiode APD, the position of the p-type semiconductor layer and the n-type semiconductor layer may be reversed.

1.2 Operation

Next, the operation of the distance measurement device according to the first embodiment will be described.

1.2.1 Scan Operation

A laser light scan operation in the distance measurement device according to the first embodiment will be described with reference to FIG. 7. FIG. 7 schematically shows a relationship between the shape and trajectory of the laser light L1, with which a target TG is scanned, and the shape and trajectory of the laser light L2 reflected by the target TG and incident on the light receiving section 41. FIGS. 7(A) and 7(B) illustrate cases where the laser L1 is illuminated in different shapes and trajectories in the scan operation.

First, the shapes and trajectories of the laser light L1 and L2 are explained.

As shown in FIG. 7(A), in the scan operation, the distance measurement device 1 illuminates the laser light L1 at one time on a series of the parts of the target TG in the vertical direction, using a cylindrical lens, a collimator lens, and a laser light source having an illumination surface thinly-shaped with respect to the vertical direction of the drawing. This realizes the advantage of enabling multiple pixels PX in the vertical direction to receive light in a single illumination, thus leading to improved resolution of a distance image. Furthermore, it is possible to slide the laser light L1 in the horizontal (left-right) direction of the drawing while illuminating the laser light L1 on a series of parts of the target TG in the vertical direction all at once. As a means of realizing the above-described scan operation, a rotational mirror or a single-axis mirror may be used as the mirror 22.

As shown in FIG. 7(B), while simultaneously illuminating a series of parts of the target TG in the vertical direction with the laser light L1 through using a cylindrical lens, a collimator lens, and a laser light source having an illumination surface in a thin shape, the distance measurement device 1 can perform an operation of sliding the laser light L1 in a horizontal direction several times, changing locations along the vertical direction. As a means of realizing such scanning, for example, a polygon mirror having different tilt angles, a rotational mirror, or a two-axis mirror, etc., may be used as the mirror 22.

In any of the above-described methods, a target TG is illuminated with the laser light L1 in a thin shape and in a vertical direction, and the shape of the laser light L2 reflected by the target TG and incident on the light receiving section 41 is also a thin shape in a vertical direction.

If the laser light L1 is emitted in a thin shape and in a vertical direction on the target TG, the shape of the laser light L1 is tilted in the horizontal direction in accordance with an emission angle at an emission position of the laser light L1 with respect to the distance measurement device 1. For example, if an emission angle becomes its smallest at the center of the target TG, the tilt of the shape of the emitted laser light L1 in the horizontal direction, which is 0 at the center, increases to a positive value as an illuminated position nears the first edge in the horizontal direction of the target TG, and decreases to a negative value as an illuminated position nears the second edge in the horizontal direction of the target TG.

As described above, the distance measurement device 1 according to the present embodiment is constituted by a non-coaxial optical system, and its light receiving unit has an image-forming optical system. Thus, the laser light L2 reflected by a target is incident on the light receiving section 41, with a constant tilt with respect to the horizontal direction (though the direction of the tilt is inverted). For this reason, in the light receiving section 41, the closer the laser light L2 to the edge of the light receiving section 41, the greater an absolute value of the tilt of the laser light L2 in the horizontal direction. Accordingly, in the distance measurement device 1 according to the present embodiment, the closer the laser light L2 to the edge of the light receiving section 41, the greater an absolute value of the tilt. Furthermore, it is required to appropriately select the exact number of pixels PX (not a pixel more, not a pixel less) corresponding to a region into which the laser light L2 enters.

In the description hereinafter, the long-axis direction of the shape of the laser light L2 corresponds to the row direction of the light receiving section 41, and the short-axis direction of the shape of the laser light L2 (or the tilt direction of the laser light L2) corresponds to the column direction of the light receiving section 41.

1.2.2 Light Receiving Area Selection Operation

Next, a light receiving area selection operation will be described. The light receiving area selection operation is an operation of turning a group of pixels PX in the light receiving section 41 to an on state so that the laser light L2 made incident on the light receiving section 41 by the scan operation can be efficiently received.

Figure 8:
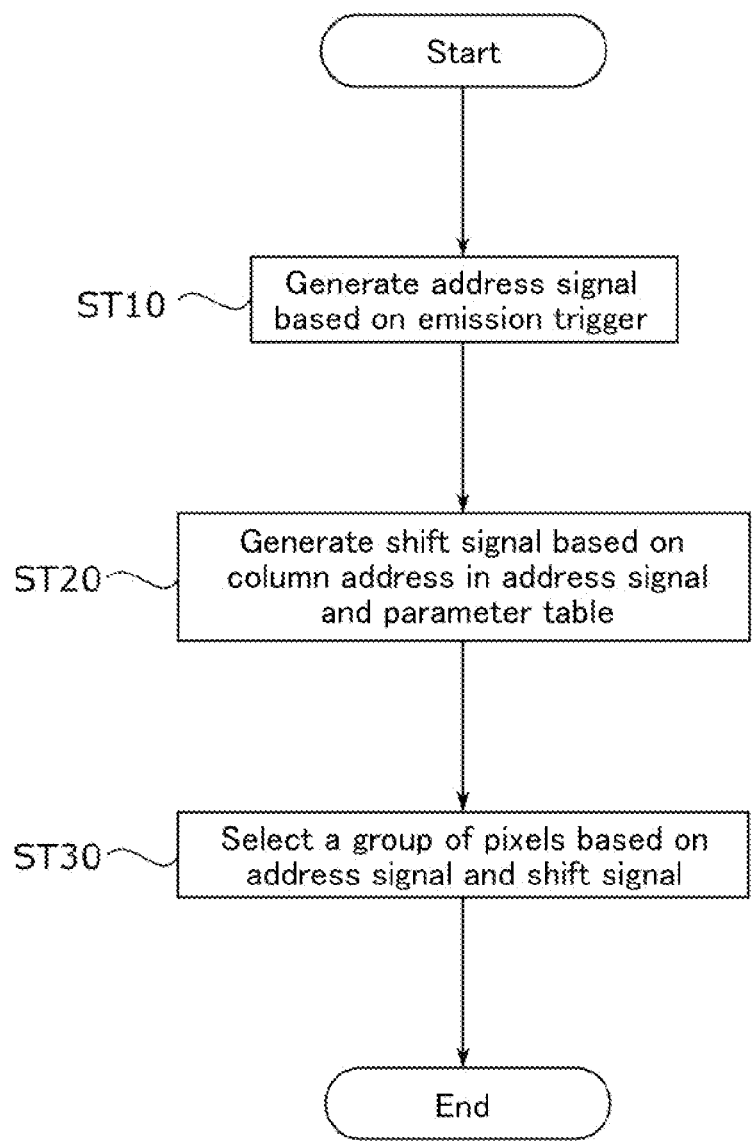
FIG. 8 is a flowchart for explaining a light receiving area selection operation in the distance measurement device according to the first embodiment.

FIG. 8 is a flowchart showing light receiving area selection operation in the distance measurement device according to the first embodiment.

As shown in FIG. 8, in step ST10, the address selecting section 51 of the light receiving area control section 50 generates an address signal based either on an emission trigger received from the emission control section 11 or on a signal that can be associated with an emission trigger. As described above, the emission trigger is associated with an emission angle of the laser light L1 through a clock; for this reason, the emission trigger can further be associated with a column address at which the laser light L2 is made incident on the light receiving section 41. Thus, the address selecting section 51 can determine a single column address (and one or more row addresses) based on the emission trigger. The address selecting section 51 transmits the generated address signal to the shift control section 52 and to the light detector 40 and the measurement processing section 60.

In step ST20, the shift control section 52 generates a shift signal based on a column address included in the address signal and the parameter table. The shift signal includes signals left_shift<0> through left_shift <M> and right_shift<0> through right_shift <M>, for example. The shift control section 52 transmits the generated shift signal to the light detector 40 and the measurement processing section 60.

In step ST30, the light detector 40 turns a group of pixels PX to an on state at one time, based on the address signal and the shift signal. Specifically, for example, the light detector 40 activates one or more row select lines row_sel corresponding to one or more row addresses included in the address signal and activates one column select line col_sel corresponding to a column address. Thus, a group of pixels PX corresponding to the one or more activated row select line(s) row_sel and one column select line col_sel are turned to an on state all at once. The group of pixels PX turned to an on state are selected so as to cover a light receiving shape formed by the laser light L2 incident on the light receiving section 41.

After the operation is performed in the above-described manner, the light receiving area selection operation is finished.

FIG. 9 is a conceptual diagram showing a parameter table used in the light receiving area selection operation in the distance measurement device according to the first embodiment.

As shown in FIG. 9, the shift control section 52 prestores a plurality of records including five elements, "column lower limit", "column upper limit", "shift direction", "offset", and "shift interval", as a parameter table. The "column lower limit" and "column upper limit" are upper and lower limits of a column address to which those records are applied, respectively. In other words, the shift control section 52 generates a shift signal using a record in which a column address included in the address signal received from the address selecting section 51 is located between the column lower limit and the column upper limit. For example, upon receipt of the column address <4> from the address selecting section 51, the shift control section 52 generates a shift signal using a record in which the column lower limit and the column upper limit are "0" and "4" respectively.

The parameter "shift direction" defines a direction of shifting the column select line col_sel by the shift circuit SH. If the shift direction is "left" or "right", the shift control section 52 generates a signal for instructing the shift circuit SH to shift the column select line col_sel to the leftward or rightward direction, according to the indicated direction. If the shift direction is "−", the shift control section 52 generates a signal for instructing the shift circuit SH not to shift the column select line col_sel.

The parameter "offset" defines, among the plurality of shift circuits SH arranged in ascending order of row address, a row address of the shift circuit SH to be first turned to an on state. In other words, the shift control section 52 turns the shift circuit SH<0> to an on state first if the offset is "0". The shift control section 52 maintains the shift circuit SH<0> at an off state and turns the shift circuit SH<1> to an on state first among all if the offset is "1". If the offset is "−", the shift control section 52 turns all shift circuits SH to an off state.

The parameter "shift interval" defines an interval of two on-state shift circuits SH with respect to the row direction. That is, when the shift circuit SH<m> is in an on state, if the shift interval is "0", the shift control section 52 next turns the shift circuit SH<m+1> to an on state. If the shift interval is "1", after the shift circuit SH<m>, the shift control section 52 next turns the shift circuit SH<m+2> to an on state. If the shift interval is "−", the shift control section 52 turns all shift circuits SH to an off state.

Through referring to the above-described parameter, the shift control section 52 is able to select a group of pixels PX tilted in the column direction and arranged in the row direction ("a subset of pixels") as a light receiving area (partial pixel area), based on a single column select line col_sel.

Figure 10:
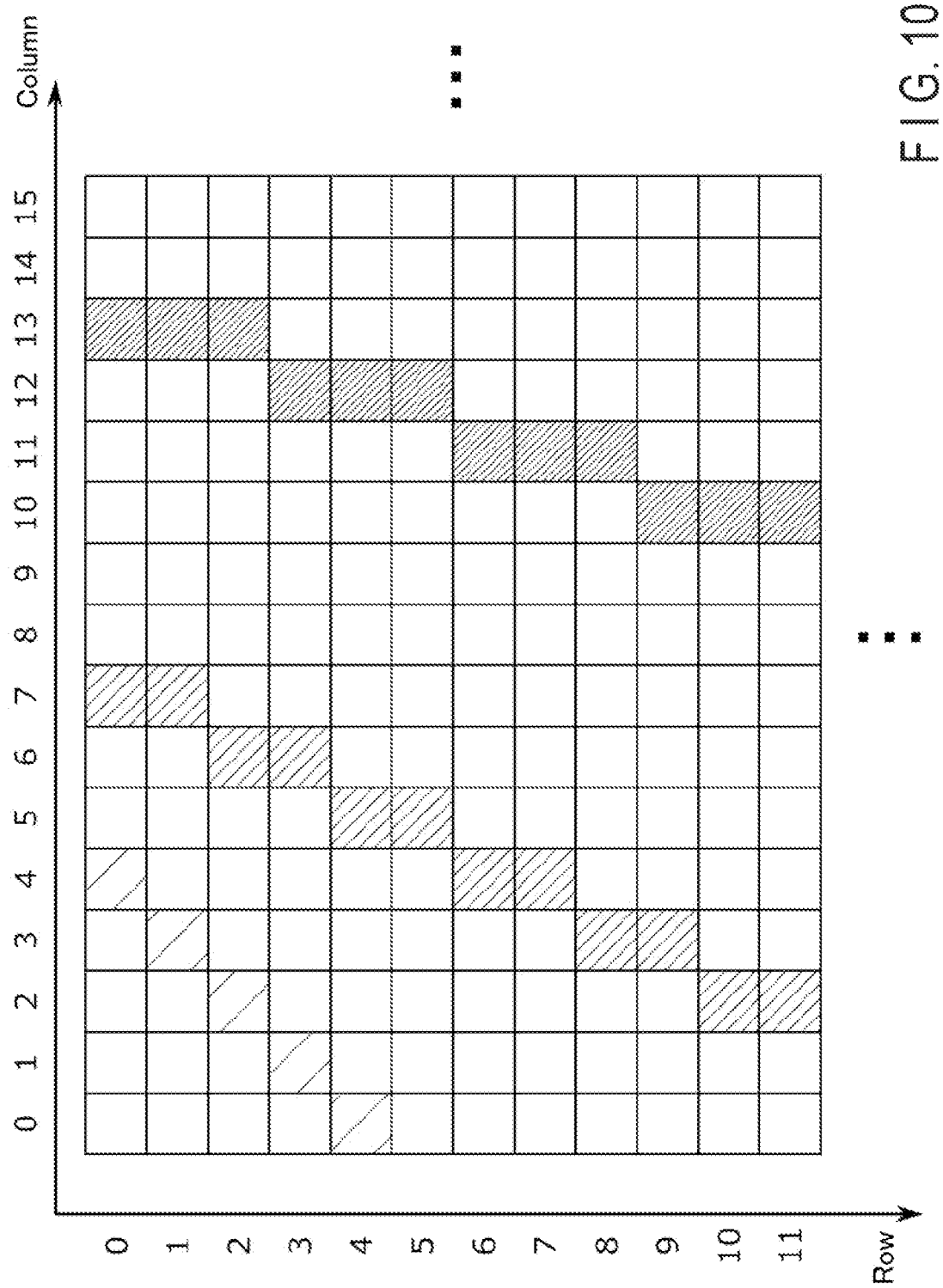
FIG. 10 is a schematic diagram for explaining a light receiving area selected by the light receiving area selection operation in the distance measurement device according to the first embodiment.

FIG. 10 is a schematic diagram showing a light receiving area selected by the light receiving area selection operation in the distance measurement device according to the first embodiment. FIG. 10 shows, as an example, a light receiving area selected based on the parameter table of FIG. 9 when the column addresses <4>, <7>, and <13> are received from the address selecting section 51.

As shown in FIG. 10, the shift control section 52 is able to select a light receiving area having a different tilt according to a column address. The light receiving area selection operation will be described more specifically below.

First, a case where the column address <4> is received from the address selecting section 51 will be described.

The shift control section 52 refers to a parameter table, and selects a record in which the column lower limit and the column upper limit are "0" and "4" respectively.

The shift control section 52 first decides to turn the shift circuit SH<0> to an on state, as the offset of the selected record is "0". The shift control section 52 decides not to provide an off-state shift circuit SH between two on-state shift circuits SH (that is, to turn the shift circuits SH<1>, SH<2>, . . . , to an on state), as the shift interval of the selected record is "0".

The shift control section 52 decides to activate the signals left_shift<0>, <1>, <2>, . . . supplied to the shift circuits SH<0>, SH<1>, SH<2>, . . . determined to be turned on and not to activate the signals right_shift<0>, <1>, <2>, . . . , as the shift direction of the selected record is "left".

With the above operation, the pixels PX<0,4>, PX<1,3>, PX<2,2>, . . . , can be selected at one time.

Next, a case where the column address <7> is received from the address selecting section 51 will be described.

The shift control section 52 refers to a parameter table, and selects a record in which the column lower limit and the column upper limit are "5" and "10" respectively.

The shift control section 52 decides to turn the shift circuit SH<1> to an on state first, as the offset of the selected record is "1". The shift control section 52 decides to provide one off-state shift circuit SH between two on-state shift circuits SH (that is, to turn the shift circuits SH<3>, SH<5>, . . . , to an on state), as the shift interval of the selected record is "1".

The shift control section 52 decides to activate the signals left_shift<1>, <3>, <5>, . . . supplied to the shift circuits SH<1>, SH<3>, SH<5>, . . . determined to be turned on and not to activate the signals right_shift<1>, <3>, <5>, . . . , as the shift direction of the selected record is "left". The shift control section 52 decides not to activate the signals left_shift<0>, <2>, <4>, . . . , and the signals right_shift<0>, <2>, <4>, . . . , supplied to the shift circuits SH<0>, SH<2>, SH<4>, . . . , determined to have been turned to an off state.

With the above operation, the pixels PX<0,7>, PX<1,7>, PX<2,6>, PX<3,6>, PX<4,5>, PX<5,5>, . . . , can be selected all at once.

Next, a case where the column address <13> is received from the address selecting section 51 will be described.

The shift control section 52 refers to a parameter table, and selects a record in which the column lower limit and the column upper limit are "11" and "16" respectively.

The shift control section 52 first decides to turn the shift circuit SH<2> to an on state, as the offset of the selected record is "2". The shift control section 52 decides to provide two off-state shift circuits SH between two on-state shift circuits SH (that is, to turn the shift circuits SH<5>, SH<8>, . . . , to an on state), as the shift interval of the selected record is "2".

The shift control section 52 decides to activate the signals left_shift<2>, <5>, <8>, . . . supplied to the shift circuits SH<2>, SH<5>, SH<8>, . . . determined to have been turned on, and not to activate the signals right_shift<2>, <5>, <8>, . . . , as the shift direction of the selected record is "left". The shift control section 52 decides not to activate the signals left_shift<0>, <1>, <3>, <4>, <6>, <7>, . . . and the signals right_shift<0>, <1>, <3>, <4>, <6>, <7>, . . . , supplied to the shift circuits SH<0>, SH<1>, SH<3>, SH<4>, SH<6>, SH<7>, . . . , determined to have been turned to an off state.

With the above operation, the pixels PX<0,13>, PX<1,13>, PX<2,13>, PX<3,12>, PX<4,12>, PX<5,12>, PX<6,11>, PX<7,11>, PX<8,11>, . . . , can be selected at one time.

Of the above-described three examples, those where the column address <7> or <13> is received from the address selecting section 51 are the cases where, if viewed locally, the column direction changes and does not change between adjacent pixels PX; thus, the examples may be construed as conveying that the tilt is not constant. In the present specification, in the subset of selected pixels PX, for example the tilt of the line connecting the pixels PX on the edge in the row direction is regarded as a tilt of the partial pixel area that includes the subset of pixels PX. This allows the present embodiment to uniquely determine a tilt of the partial pixel area in the example where the column address <7> or <13> is received from the address selecting section 51. The above-described methods of determining the tilt are merely examples, and any method can be discretionarily adopted as long as a tilt of the partial pixel area can be uniquely determined.

1.3 Advantageous Effects of Present Embodiment

According to the first embodiment, the distance measurement device 1 has a non-coaxial optical system and detects a reflected light L2 from a target TG by turning multiple pixels PX arranged in the row direction to an on state. The address selecting section 51 generates an address signal that includes one or more row addresses and one column address based on an emission trigger. The shift control section 52 controls the shift direction, offset, and shift interval of the shift circuit SH by referring to the parameter table, in accordance with a column address selected by the address selecting section 51. This control allows for shifting of the column address of the on-state pixels PX in the row direction at a discretionary timing. Thus, even when the tilt of the shape of the laser light L2 incident on the light receiving section 41 changes depending on a column position, a group of pixels PX that includes the light receiving area (no more or less than the exact number) can be turned to an on state without a need to increase the number of column select lines col_sel to be activated. Thus, the pixels PX can be selected subject to consideration of a change in a tilt that occurs in a light receiving pattern.

If the light receiving method does not have a shift function, it is necessary to increase the number of column select lines col_sel to be activated and turn a rectangular area that covers the tilted light receiving area to an on state. For example, if the number of column select lines col_sel to be activated is increased ten times, since optical noise is dominant in the S/N ratio of SiPM LiDAR, noise also increases by a factor of 10. For this reason, the S/N ratio of the LiDAR is degraded by a factor of $\sqrt{10}\approx3.16$. In other words, according to the first embodiment, the S/N ratio is improved by a factor of $\sqrt{10}\approx3.16$ as compared to the light receiving method without the shift function. Accordingly, it is expected that performance in the distance measurement, such as measurable distance or distance accuracy, etc., can be greatly improved as a whole.

To add further explanation, in a distance measurement device of a coaxial optical system, a separated optical system, or a rotational type, distortion in shapes or a tilt does not occur between the emitted laser light L1 and the laser light L2 incident on the light receiving section 41, unlike with the non-coaxial optical system as in the present embodiment. Thus, a phenomenon where a tilt occurs in the light receiving pattern is a problem unique to a non-coaxial optical system. Furthermore, an extent of the tilt that occurs in the light receiving pattern is dependent on an emission angle between the distance measurement device 1 and a location at which the laser light L1 reflects on the target TG. For this reason, for a scan method in which a laser light L1 in a vertically thin shape is radiated on a target TG as the laser light is being slid in a horizontal direction, the tilt of the light receiving area in the light receiving section 41 may become larger if the column position is nearer the edge of the light receiving section 41. Furthermore, the plus and minus of the tilt of the light receiving region in the light receiving section 41 may be inverted depending on whether the column position is at the first edge or the second edge of the light receiving section 41.

According to the first embodiment, the shift control section 52 prestores a parameter table in which a shift direction, an offset, and a shift interval are individually configurable according to a column address. The light detector 40 has multiple shift circuits SH provided between pixels PX adjacent in the row direction, for each row address. Thus, the shift control section 52 is able to activate a shift circuit SH corresponding to a discretionary row address based on the parameter table. For this reason, it is possible to form a light receiving area having a discretionary tilt according to a selected column address.

1.4 Modifications

In the foregoing first embodiment, a case where the address selecting section 51 selects a single column address (e.g., column address <n>) is described; however, the first embodiment is not limited thereto. For example, the address selecting section 51 may further select adjacent column address <n+1> or <n−1> in addition to the column address <n>.

Figure 11:
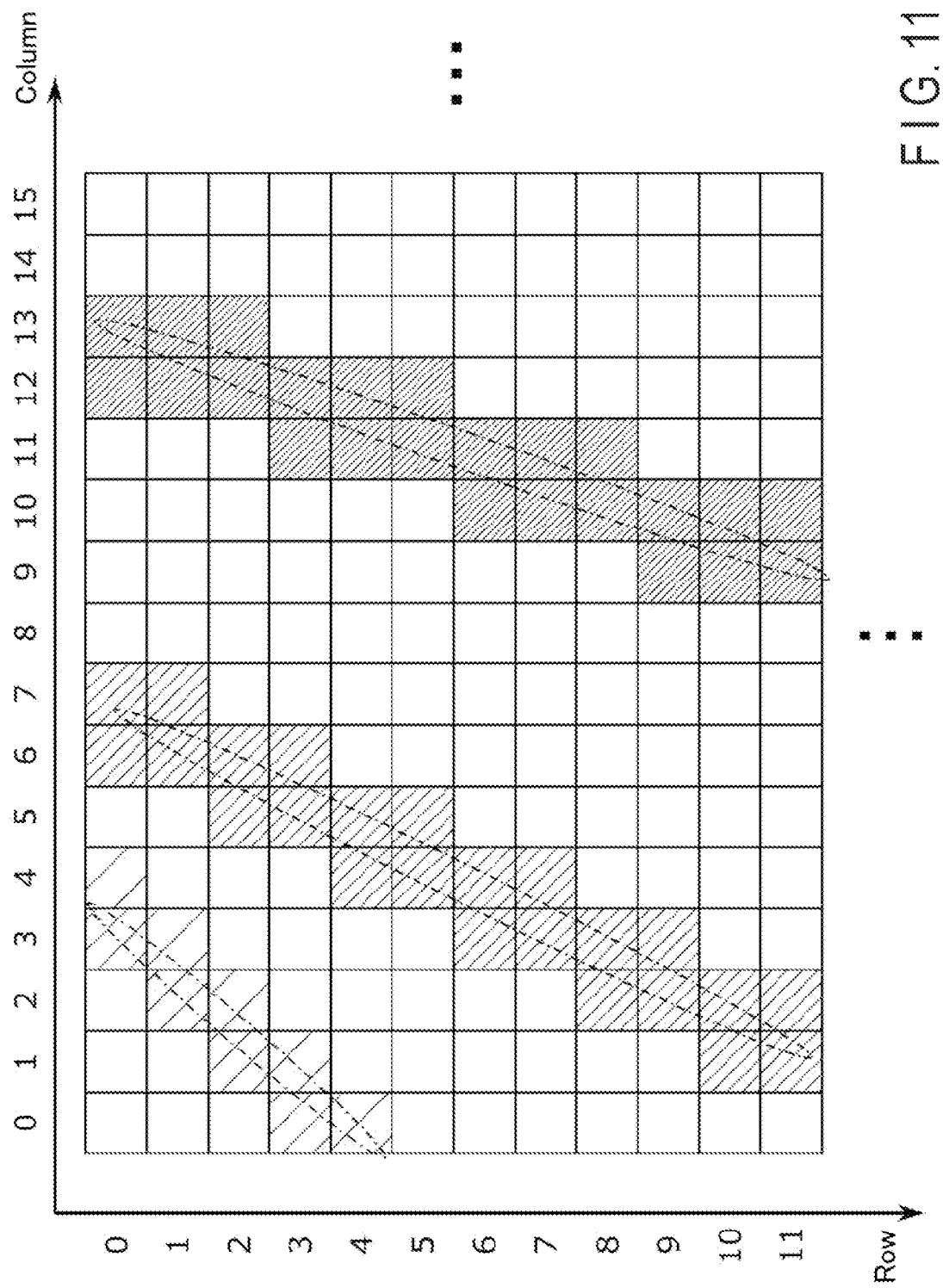
FIG. 11 is a schematic diagram for explaining a light receiving area selected by a light receiving area selection operation in a distance measurement device according to a modification of the first embodiment.

FIG. 11 is a schematic diagram for explaining the light receiving area selection operation in the distance measurement device according to a modification of the first embodiment and corresponds to FIG. 10 of the first embodiment.

As shown in FIG. 11, the address selecting section 51 may further select the column address <3> in addition to the column address <4> if the column address <4> is selected. Similarly, if the column address <7> is selected, the column address <6> may be further selected in addition to the column address <7>. If the column address <13> is selected, the column address <12> may be further selected in addition to the column address <13>.

The optimal number of columns to be selected changes according to a column position (address). In the center where a tilt is small, the number of selected columns can be a minimum (e.g., 1); on the other hand, in the edges where a tilt is large, the number of selected columns should be a maximum (e.g., 2). In the present modification, the number of selected columns is added as data of the records shown in FIG. 9 and is designated for each pair of the column lower limit and the column upper limit.

With the above-described operation, it is possible to efficiently collect output signals IOUT even in a case where the laser light L2 incident on the light receiving section 41 acts on multiple pixels PX.

The light detector 40 only requires an increase in the number of column select lines col_sel to be selected based on an address signal and a shift signal. The light detector 40 can efficiently collect output signals IOUT, without a need to add new signal lines to the row select lines row_sel and the column select lines col_sel shown in FIG. 3.

2. Second Embodiment

Next, a distance measurement device according to a second embodiment is described. In the first embodiment, a case where a signal supplied to a row select line row_sel, and signals left_shift and right_shift are individually generated, was described. The second embodiment differs from the first embodiment in that a signal supplied to a row select line row_sel is generated based on signals left_shift and right_shift. In the following, descriptions of similar configuration and operation between the first and second embodiments will be omitted, and differences will be mainly described.

2.1 Circuit Configuration of Light Detector

Figure 12:
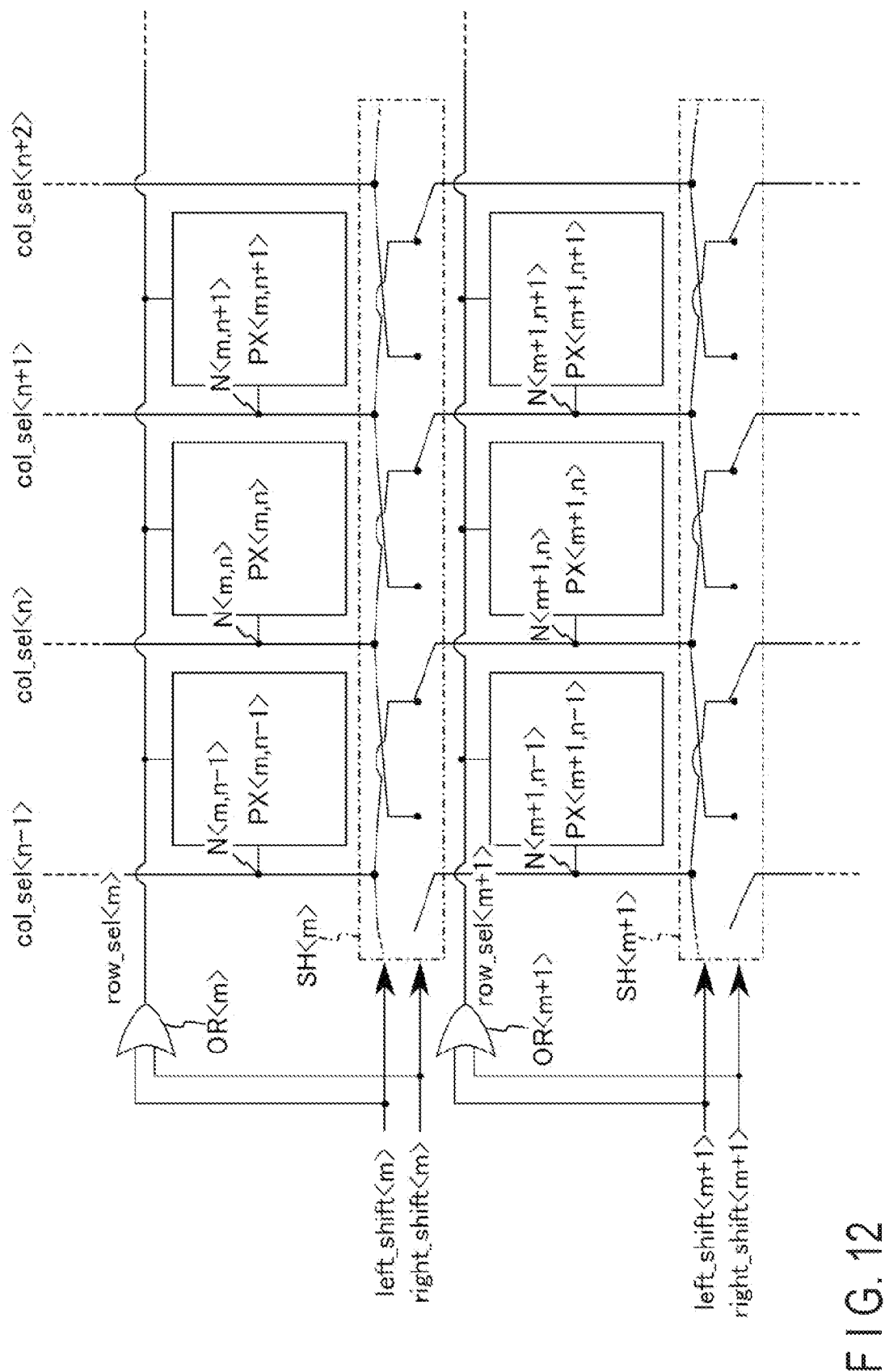
FIG. 12 is a circuit diagram for explaining a configuration of a light detector according to a second embodiment.

FIG. 12 is a circuit diagram to explain a configuration of the light detector according to the second embodiment and corresponds to FIG. 3 of the first embodiment.

As shown in FIG. 12, in the light detector 40, an OR circuit OR is provided in each row select line row_sel. Specifically, the OR circuit OR<m> includes a first input end to which a signal left_shift<m> is supplied, a second input end to which a signal right_shift<m> is supplied, and an output end coupled to a row select line row_sel<m>. Similarly, the OR circuit OR<m+1> includes a first input end to which a signal left_shift<m+1> is supplied, a second input end to which a signal right_shift<m+1> is supplied, and an output end coupled to a row select line row_sel<m+1>.

FIG. 13 is a table showing the relationship between shift signals and a row selection in the light detector according to the second embodiment.

As shown in FIG. 13, the OR circuit OR<m> outputs a non-activated signal to the row select line row_sel<m> upon receipt of non-activated (indicated as "False" in FIG. 13) signals right_shift<m> and left_shift<m>. As a result, the multiple pixels PX<m> coupled to the row select line row_sel<m> are turned to a non-selected state. The shift circuit SH<m> is configured not to shift all column select lines col_sel between the pixels PX<m> and the pixels PX<m+1> upon receipt of non-activated signals right_shift<m> and left_shift<m>.

The OR circuit OR<m> outputs an activated signal to the row select line row_sel<m> upon receipt of activated (indicated as "True" in FIG. 13) signal right_shift<m> and non-activated signal left_shift<m>. As a result, the multiple pixels PX<m> coupled to the row select line row_sel<m> are turned to a selected state. The shift circuit SH<m> is configured to shift all the column select lines col_sel between the pixel PX<m> and the pixel PX<m+1> in the rightward direction, upon receipt of the activated signal right_shift<m> and the non-activated signal left_shift<m>.

The OR circuit OR<m> outputs an activated signal to the row select line row_sel<m> upon receipt of non-activated signal right_shift<m> and activated signal left_shift<m>. As a result, the multiple pixels PX<m> coupled to the row select line row_sel<m> are turned to a selected state. The shift circuit SH<m> is configured to shift all column select lines col_sel between the pixels PX<m> and the pixels PX<m+1> in the leftward direction, upon receipt of non-activated signal right_shift<m> and activated signal left_shift<m>.

The OR circuit OR<m> outputs an activated signal to the row select line row_sel<m> upon receipt of activated signals right_shift<m> and left_shift<m>. As a result, the multiple pixels PX<m> coupled to the row select line row_sel<m> are turned to a selected state. The shift circuit SH<m> is configured not to shift all column select lines col_sel between the pixels PX<m> and the pixels PX<m+1> upon receipt of activated signals right_shift<m> and left_shift<m>.

With the above-described configurations, a signal supplied to a row select line row_sel can be generated based on signals left_shift and right_shift corresponding to the same row address.

2.3 Advantageous Effects of Present Embodiment

According to the second embodiment, the light detector 40 includes an OR circuit OR having input ends into which the signals left_shift and right_shift are input, and having an output end to which the row select line row_sel is coupled. It is thereby possible to turn the pixels PX to an on state, without the need for individually generating signals supplied to the row select line row_sel. It is thus thereby possible to reduce the number of signals used in the pixel area selection operation. For this reason, increase in design load of the distance measurement device 1 can be suppressed.

3. Third Embodiment

Next, a distance measurement device according to a third embodiment is described. The third embodiment differs from the first and second embodiments in that a selected pixel correction operation is performed to additionally select positional correction pixels for correcting a selected-pixel area. In the following, descriptions of configuration and operation similar to the first embodiment will be omitted, and differences will be mainly described.

3.1 Configuration of Distance Measurement Device

Figure 14:
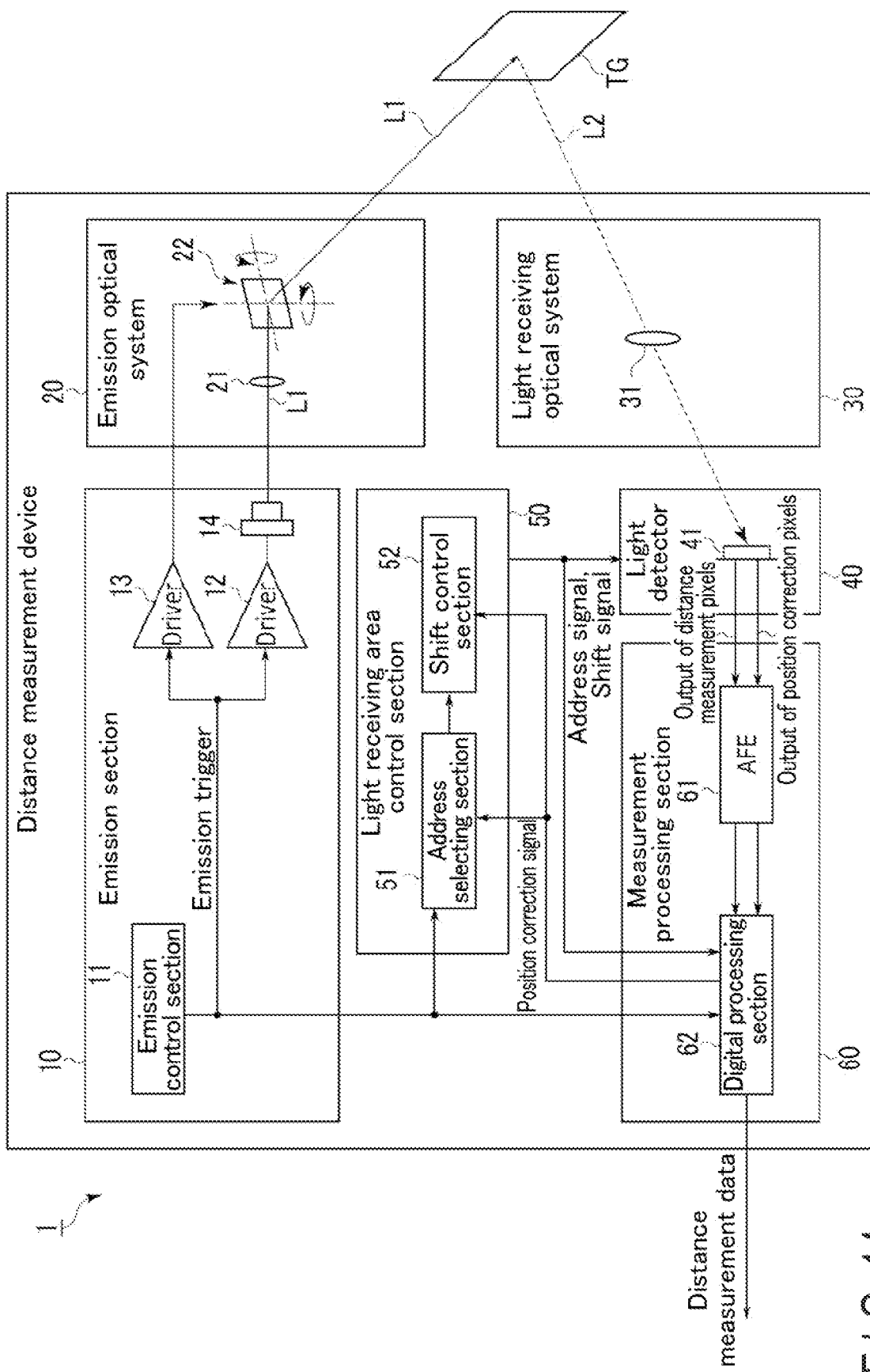
FIG. 14 is a block diagram for explaining a configuration of a distance measurement device according to a third embodiment.

FIG. 14 is a block diagram showing a configuration of the distance measurement device according the third embodiment and corresponds to FIG. 1 of the first embodiment.

As shown in FIG. 14, the digital processing section 62 generates positional correction signals based on output signals of multiple pixels PX output from the light receiving section 41, and transmits the positional correction signal to the address selecting section 51 and the shift control section 52. The positional correction signal is a signal for making minor adjustments (correction) to a combination of the pixels PX to be turned to an on state in the light receiving section 41.

Upon receipt of the positional correction signal, the address selecting section 51 and the shift control section 52 perform correction processing associated in advance with the positional correction signal on the address signal and the shift signal, respectively. The address signal and shift signal to which the correction processing has been performed are transmitted to the light detector 40 and the measurement processing section 60. The details of the correction processing will be described later.

The light detector 40 may additionally turn the pixels for generating positional correction signals in the digital processing section 62 to an on state. In the descriptions below, the pixels mainly used for generating the positional correction signals will be referred to as "positional correction pixels", and the pixels mainly used for measuring a distance will be referred to as "distance measurement pixels" in order to distinguish their usages as needed. Those names are used only for convenience, and use of a positional correction pixel for distance measurement and vice versa is not restricted.

3.2 Position Correction Pixels

Figure 16:
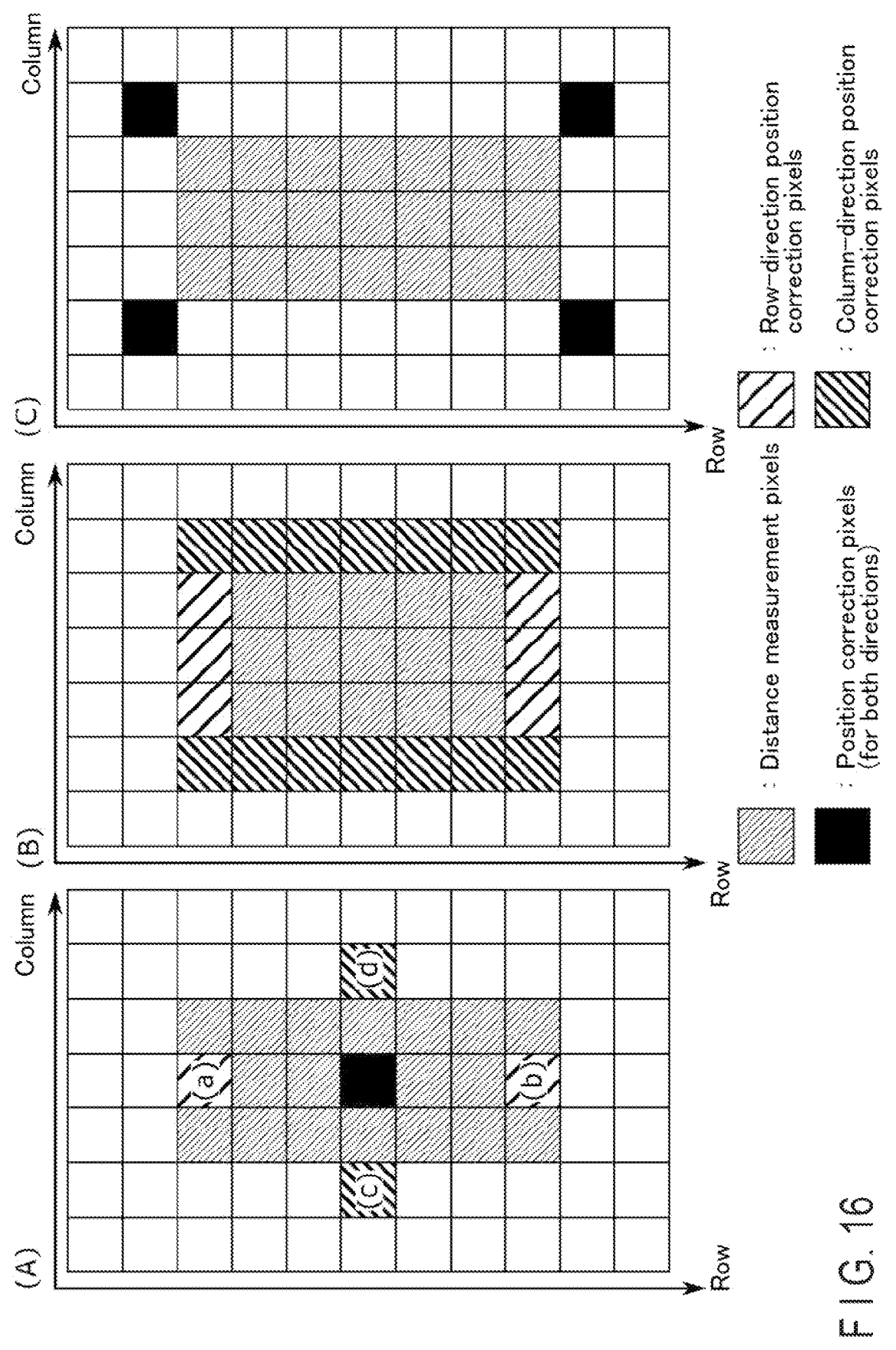

FIGS. 15 and 16 are schematic drawings showing the positional correction pixels in the distance measurement device according to the third embodiment. FIGS. 15 and 16 show three specific examples of the positions at which the positional correction pixels are arranged with respect to the distance measurement pixels. FIGS. 15 and 16 correspond to cases where the column direction shifting is considered and not considered, respectively, in those three specific examples. For simplification, the descriptions hereinafter will be made with reference to FIG. 16 in which a column direction shifting is not considered.

In the example of FIG. 16(A), at the column position among the center of the distance measurement pixels, a pair of distance measurement pixels located on the ends of the distance measurement pixels in the row direction (namely, the pixels (a) and (b) in FIG. 16(A)) is used as the row-direction positional correction pixels. At the row position of the center among the distance measurement pixels, a pair of distance measurement pixels located on the ends of the distance measurement pixels in the column direction (namely, the pixels (c) and (d) in FIG. 16(A)) is used as the column-direction positional correction pixels. The pixel located at the center among the distance measurement pixels may be used for both the column-direction and row-direction positional correction. Thus, although positional correction pixels are not necessarily located at the edges of the distance measurement pixel arrangement, multiple positional correction pixels are always provided in either the row or column direction. Herein, the relative positions of the positional correction pixels with respect to the distance measurement pixels are not dependent on the absolute positions of the distance measurement pixels and are rather constant.

In the example of FIG. 16(B), of the four sides surrounding the distance measurement pixels, a pair of pixel groups located on two sides in the row direction is used to provide row-direction positional correction pixels. Of the four sides surrounding the distance measurement pixels, a pair of pixel groups located on the two sides in the column direction is used to provide column-direction positional correction pixels. The pair of pixel groups is arranged in such a manner that the pair arranged on the two sides in the row direction have a matching center of gravity with respect to the column direction, and the pair arranged on the two sides in the column direction have a matching center of gravity with respect to the row direction.

Thus, if two groups of pixels constitute a pair, the outputs of each of those groups may be integrated and output as one set of data. It is thereby possible to increase an output value as compared to a case where only one pixel is used, and to shorten a time required for obtaining positional correction evaluation values, which will be described later. Furthermore, through using multiple pixels, the output becomes more susceptible to various fluctuations caused by external factors, and more accurate and robust operation of selected pixel correction can be performed.

In the example of FIG. 16(C), the pixels outside of the distance measurement pixels at the four corners, namely the pixels located at top left, top right, bottom left, and bottom right of the distance measurement pixels are used for positional correction both in the column direction and the row direction. Specifically, for example, the data to which the outputs of a set of positional correction pixels located at top left and top right are added, and the data to which the outputs of a set of positional correction pixels located at bottom left and bottom right are added are used as an output from a pair of row-direction positional correction pixels. For example, the data to which the outputs of a set of positional correction pixels located at top left and bottom left are added, and the data to which the outputs of a set of positional correction pixels located at top right and bottom right are added are used as an output from a pair of column-direction positional correction pixels. The processing to which the output is added may be realized by combining the current by line coupling.

As described above, in each of the cases shown in FIG. 16, a pair of pixels that serves as a pair of column-direction positional correction pixels is arranged in such a manner that the row-direction positions of those pixels are equal, and the output from the pixels is simultaneous (at a timing at which the same pixel groups are selected). Similarly, a pair of pixels that serves as a pair of row-direction positional correction pixels is arranged in such a manner that the column-direction positions of those pixels are equal, and the output from the pixels is simultaneous.

3.3 Selected Pixel Correction Operation

First, the selected pixel correction operation in the distance measurement device according to the third embodiment is described.

3.3.1 Flowchart

Figure 17:
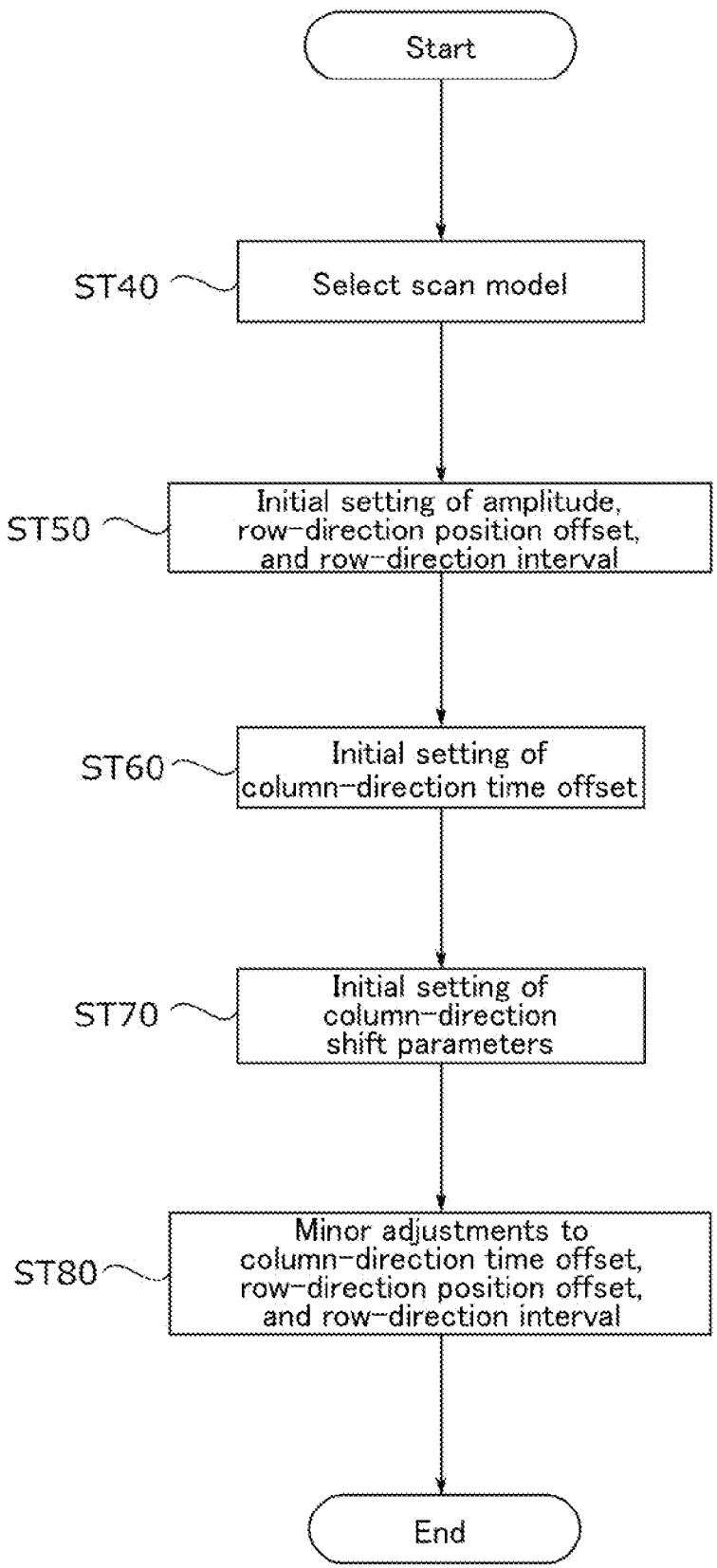
FIG. 17 is a flowchart for explaining a selected pixel correction operation in the distance measurement device according to the third embodiment.

First, a flow of the selected pixel correction operation in the distance measurement device according to the third embodiment is described. FIG. 17 is a flowchart to explain a selected pixel correction operation in the distance measurement device according to the third embodiment.

As shown in FIG. 17, in step ST40, the light detector 40 selects a scan model in which the scanning of a light receiving system (that is, a pixel selection operation in the light detector 40) is modeled.

From step ST50 through step ST70, the distance measurement device 1 performs the initial setting of the parameters for synchronizing the scanning of the emission optical system 20 with the pixel selection operation in the light detector 40, based on the scan model selected in step ST40.

Specifically, in step ST50, the distance measurement device 1 performs the initial setting of the following parameters for defining the range from which pixels are selected in the light receiving section 41: an amplitude of the column direction, a position offset in the row direction, and an interval in the row direction.

In step ST60, the distance measurement device 1 performs the initial setting of a time offset in the column direction as a parameter for defining a timing to select pixels in the light receiving section 41. The amplitude in the column direction may be set in step ST60, together with the time offset in the column direction.

In step ST70, the distance measurement device 1 performs the initial setting of the parameters for shifting the selected pixels in the light receiving section 41.

In step ST80, the distance measurement device 1 makes minor adjustments to the time offset in the column direction, the position offset in the row direction, and the interval in the row direction.

After the operations as described above, the selected pixel correction operation is finished.

In the following, each process shown in FIG. 17 is described in detail.

3.3.2 Selection of Scan Model

To synchronize the pixel area selected in the light detector 40 with the scanning of the emission optical system 20, a scan model of the light detector 40 that matches a scan method of the emission optical system 20 is first selected (ST40).

For example, if a polygon mirror or a rotational mirror is used as the mirror 22 of the emission optical system 20, and the emission optical system 20 is configured with a rotational type (this model will be referred to as "scan model 1"), an emission position in a horizontal direction of the laser light L1 can be approximated by a linear function. A pixel selection position x in the column direction of the light detector 40 in the scan model 1 is expressed as Expression (1) below as function of time t:

$$x = 2a \times (t-\varphi)/(T-\Delta T) \text{ (but } \varphi \leq t < T-\Delta T+\varphi\text{)} \quad (1)$$

wherein "a" represents a half value of horizontal amplitude (which hereinafter may be referred to as "amplitude"), "$\varphi$" represents an offset in the column direction in terms of time "t" (which hereinafter may be referred to as "column-direction time offset"), "T" represents a cycle, and "$\Delta T$" represents a blanking time. The amplitude "a", the cycle "T", and the blanking time "$\Delta T$" may be expressed as a scanning velocity $v=2a/(T-\Delta T)$.

Furthermore, if an MEMS (micro electro mechanical system) is used as the mirror 22 of the emission optical system 20 for example (this model will be referred to as "scan model 2"), an emission position in the horizontal direction of the laser light L1 may be approximated by a sine function. For this reason, the pixel selection position x in the column direction of the light detector 40 in the scan model 2 is expressed as Expression (3) below as a function of time t:

$$x = a \times \sin(\omega t - \varphi) \quad (3)$$

wherein "$\omega$" is an angular velocity and corresponds to cycle "T" in Expression (1).

FIG. 18 is a schematic diagram showing an example of a scan model in the distance measurement device according to the third embodiment. FIG. 18 shows a relationship between the scanning positions of the laser light L2 and the parameters relating to the row direction in the case where the scan operation illustrated in FIG. 7(B) of the first embodiment.

In either scan model, the light detector 40 starts, as shown in FIG. 18, the above-described column-direction scanning from the position offset R0 in the row direction (hereinafter "row-direction position offset") and repeats the scanning for the number of times n, which corresponds to the number of rows, changing the scanning position by the row-direction interval $\Delta R$. In a case where the cycle T and the number of rows n are set in advance by a user, independent parameters that should be set in the initial setting are the amplitude a, the column-direction time offset $\varphi$, the row-direction position offset R0, and the row-direction interval $\Delta R$.

In the above-described example, the scan models are expressed by functions to simplify the descriptions; however, the models are not limited to those expressions. For example, a scan model may be expressed as a table of a set of parameters which are associated with a set of corresponding values.

3.3.3 Initial Settings of Amplitude, Row-direction Position Offset, and Row-direction Interval After a scan model is selected, initial setting of the amplitude a, the row-direction position offset R0, and the row-direction interval $\Delta R$ is subsequently performed (ST50).

The address selecting section 51 performs scanning on the selected pixels in the light detector 40 over the whole surface of the light receiving section 41, and at an extremely low speed. The light detector 40 calculates the integral of amounts of light received in each selected pixel over a long period of scanning time, and outputs the integral. The measurement processing section 60 determines, based on the output result, an area (frame) capable of receiving the laser light L2 in the light receiving section 41 for each of the column direction and the row direction.

The measurement processing section 60 determines, based on the determination result, the amplitude a, which is a parameter relating to the column direction, and the row-direction position offset R0 and the row-direction interval $\Delta R$, which are the parameters relating to the row direction. The determined amplitude a, row-direction position offset R0, and row-direction interval $\Delta R$ are set at the light receiving area control section 50.

3.3.4 Initial Setting of Column-direction Time Offset

Subsequently, the initial setting of the column-direction time offset $\varphi$ is performed (ST60).

The address selecting section 51 performs scanning on the selected pixels in the light detector 40, largely changing the column-direction time offset $\varphi$ for each predetermined period of time (for example, scanning period per frame), with the amplitude a, the row-direction position offset R0, and the row-direction time interval $\Delta R$ having been set in step ST50. The light detector 40 calculates the integral of the amounts of light received by the positional correction pixels and outputs the integral. The measurement processing section 60 calculates, per frame, the integral of the output of positional correction pixels corresponding to a frame. For example, the measurement processing section 60 calculates, per frame, the integral of the output (brightness value) of each of the pixels (c) and (d) in FIG. 15(A) and calculates an evaluation value used for positional correction ("positional correction evaluation value").

The measurement processing section 60 may calculate the positional correction evaluation value based not only on an amplitude of brightness but also on the probability of distance measurability and reliability of distance measurement data. If the probability of distance measurability is used as a positional correction evaluation value, the measurement processing section 60 determines whether or not the distance measurement using positional correction pixel output has been successful and counts (or integrates) the number of successful times over, for example, a period of time required for scanning a single frame. Whether or not the distance measurement has been successful is determined based on, for example, whether or not a brightness value or reliability of a positional correction pixel is greater than a predetermined threshold.

Figure 19:
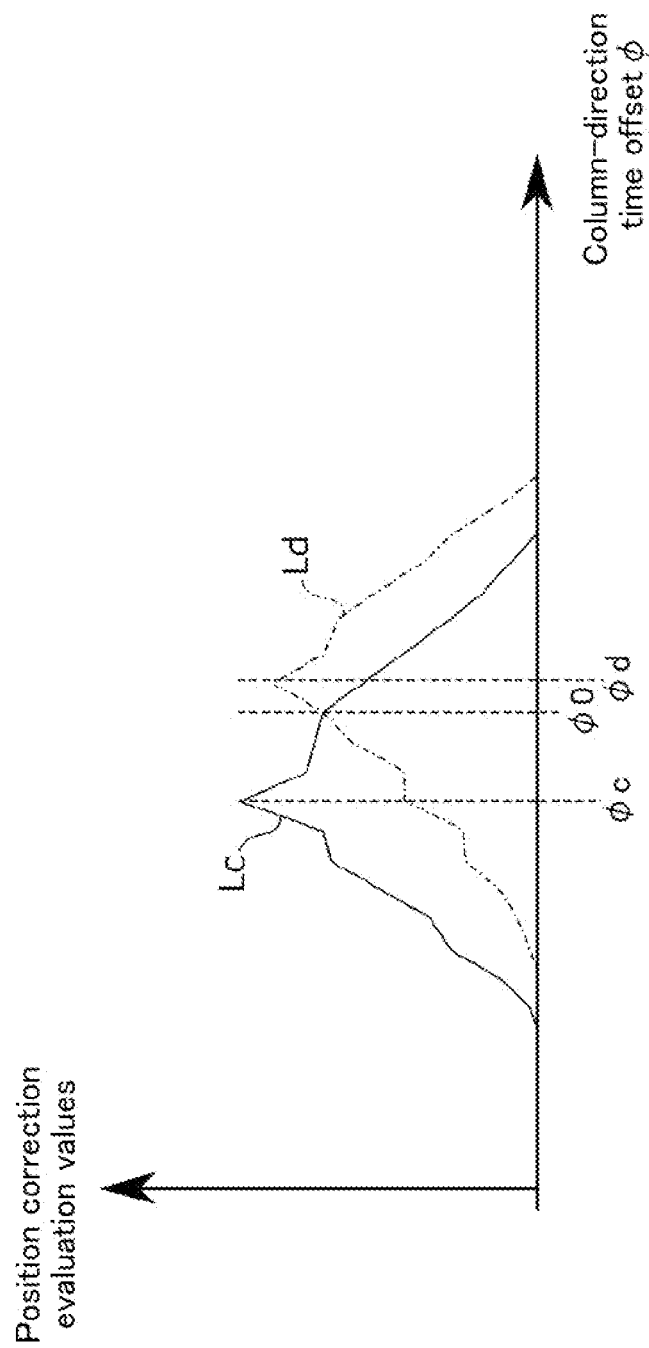
FIG. 19 is a diagram for explaining the relationship between a column-direction time offset and a positional correction evaluation value in the distance measurement device according to the third embodiment.
Figure 20:
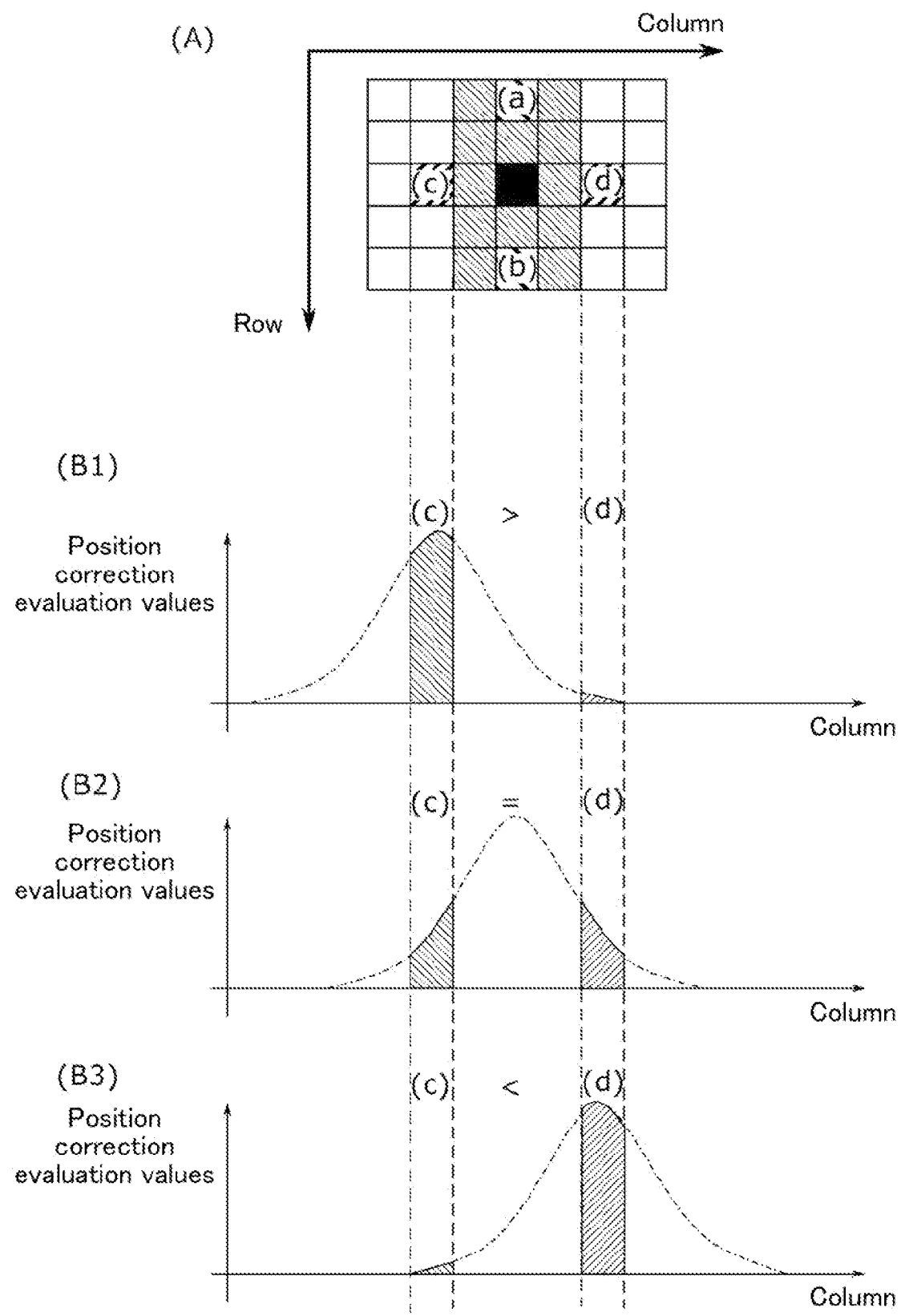
FIG. 20 is a diagram for explaining the relationship between a column-direction time offset and a positional correction evaluation value in the distance measurement device according to the third embodiment.

FIGS. 19 and 20 are diagrams showing the relationships between a column-direction time offset and a positional correction evaluation value in the distance measurement device according to the third embodiment. In FIG. 19, the lines Lc and Ld show the change of the positional correction evaluation value calculated for each of the column-direction positional correction pixels (c) and (d) at the positions shown in FIG. 15(A) with respect to the change of the column-direction time offset $\varphi$. In each of FIGS. 20(B1) through 20(B3), the positional correction evaluation value in a specific column-direction time offset $\varphi$ is shown together with the distribution of the evaluation values along the varying column positions. FIG. 20(A) graphically shows the relationship between the distributions of the evaluation values shown in FIGS. 20(B1) through 20(B3) and the column positions.

As shown in FIG. 19, the lines Lc and Ld take their peak values at the column-direction time offsets $\varphi c$ and $\varphi d$, respectively. This indicates that the column-direction positional correction pixels (c) and (d) are located at the center or the vicinity thereof in the light receiving area at the column-direction time offset $\varphi c$ and $\varphi d$. In other words, the lines Lc and Ld at the column-direction time offset $\varphi c$ respectively correspond to the shaded parts on the left side and the right side in the FIG. 20(B1), and the lines Lc and Ld at the column-direction time offset $\varphi d$ respectively correspond to the shaded parts on the left side and the right side in the FIG. 20(B3).

The lines Lc and Ld intersect each other at the offset value $\varphi 0$ that falls between the column-direction time offset values $\varphi c$ and $\varphi d$. This indicates that, at the column-direction time offset $\varphi 0$, the positional correction evaluation values (for example, brightness or probability of distance measurability) of two column-direction positional correction pixels (c) and (d) become equal, and that the positional correction evaluation values of pixels located between the pixels (c) and (d), namely, distance measurement pixels, become higher still. In other words, the lines Lc and Ld at the column-direction time offset $\varphi 0$ respectively correspond to the shaded parts on the left and right sides of the FIG. 20(B2).

If such a column-direction time offset $\varphi 0$ is set as an initial value, it is expected that column-direction deviation of the pixel-selected area from the light receiving area can be suppressed.

With the above-described initial setting of the column-direction time offset $\varphi$, an object (target) is required; however, a LiDAR mounted on a vehicle can use road surfaces as an object, as it can constantly receive light reflected from these road surfaces (for example, the ground surface of a parking lot). If a road surface is used as an object, since such a road surface is usually located in the lower half of the field of view, data that can be counted (or integrated) within a period of time required for scanning a single frame as described above is only a lower-half area of one frame. For this reason, the measurement processing section 60 integrates the outputs from the positional correction pixels over a period of time during which scanning is performed only in a lower half of one frame which thus corresponds to the road surface.

Furthermore, with the above-described initial setting of the column-direction time offset $\varphi$, it is desirable to use, among various types of road surface relatively close to the vehicle which has a higher probability of distance measurability. It is thus possible to complete the initial settings in a relatively short period of time as compared to when the object is a road surface relatively far from the vehicle which has a lower probability of distance measurability.

3.3.5 Initial Setting of Shift Parameters

After the initial values of the parameters of the scan model are determined, initial values of shift parameters are set (step ST70).

Figure 21:
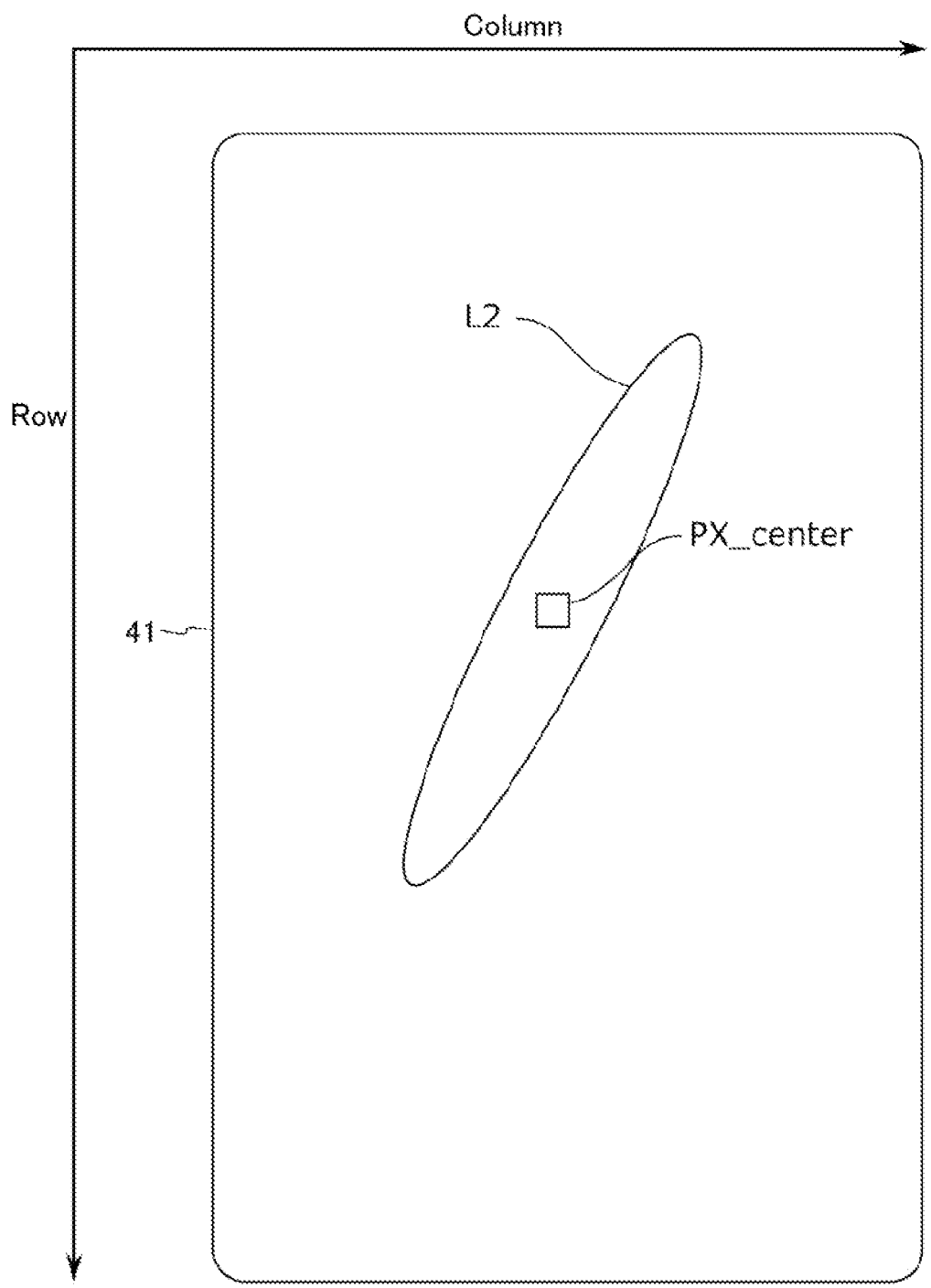
FIG. 21 is a schematic diagram for explaining an illumination pattern of laser light with which the light receiving section in the distance measurement device is radiated according to the third embodiment.

FIG. 21 is a schematic diagram showing an illumination pattern of laser light with which the light receiving section is radiated in the distance measurement device according to the third embodiment.

As shown in FIG. 21, the illumination pattern of the laser light L2 emitted on the light receiving section 41 has a certain tilt in the row direction and approximately two-fold symmetry with respect to the center pixel PX_center in the row direction. Herein, note that, up to step ST60, the initial values of the parameters such as the amplitude a and the column-direction time offset $\varphi$ are calculated in such a manner that the position of the center pixel PX_center of the illumination pattern is generally correct, on the assumption that the tilt of the illumination pattern is zero.

As described above, since an amount of shift is dependent on a column position, the table such as the one shown in FIG. 9, for example, is set. Since an amount of shift does not usually change significantly from the time an optical system is designed, optimal results can be generally obtained through use of the shift parameters originally set at the time of design as fixed values.

The shift parameters may be automatically determined, regardless of a table predetermined at the time of design. For example, to determine shift parameters at a certain column position, output values from the distance measurement pixels at a column position targeted for the shift parameter determination are used.

Specifically, for example, the shift control section 52 gradually shifts the area selected by the distance measuring pixels when a shift is not taken into account to the left side, with the center pixel being fixed. The measurement processing section 60 receives an output every time the distance measurement pixels are shifted, and calculates evaluation values related to the distance measurement pixels. Subsequently, the area selected by the distance measuring pixels when a shift is not taken into account is gradually shifted toward the right side, with the center pixel being fixed. The measurement processing section 60 receives an output every time the distance measurement pixels are shifted, and calculates evaluation values related to the distance measurement pixels. The evaluation values herein, similar to the above-described positional correction evaluation values, brightness, are probability of distance measurability, and reliability of measured distance data.

Of the evaluation values thus calculated for each act of shifting performed multiple times in leftward and rightward directions, the shift parameters that define an area for selecting distance measurement pixels when maximum evaluation values are given are used as shift parameters for the column position targeted for the shift parameter determination. Then, this shift parameter determining method is performed for the column position corresponding to each row of the table shown in FIG. 9, for example.

The shift parameters are thus set.

3.3.6 Minor Adjustments to Column-Direction Time Offset, Row-Direction Position Offset, and Row-Direction Interval Subsequently, minor adjustments to the column-direction time offset $\varphi$, the row-direction position offset R0, and the row-direction interval $\Delta R$ are made (step ST80).

In the process of minor adjustment to the column-direction time offset $\varphi$, except for the fact that the width of change made to the column-direction time offset $\varphi$ becomes minute, the same processing as the initial setting of the column-direction time offset $\varphi$ is performed. Specifically, in the process of minor adjustment to the column-direction time offset $\varphi$, the column-direction time offset $\varphi$ is changed in a width corresponding to one pixel or a fraction or several tenths of one pixel.

As shown in FIGS. 20(A) and 20(B1), it is suggested that, if the positional correction evaluation value of the pixel (c) is greater than that of the pixel (d), the distance measurement pixels are shifted to the right side of the drawing sheet, with respect to the light receiving area. For this reason, the address selecting section 51 makes minor adjustments to the column-direction time offset $\varphi$ in such a manner that, for example, the distance measurement pixels and the positional correction pixels are shifted toward the left side of the drawing sheet by an amount corresponding to ⅕₀ of one pixel.

As shown in FIGS. 20(A) and 20(B3), it is suggested that, if the positional correction evaluation value of the pixel (d) is greater than that of the pixel (c), the distance measurement pixels are shifted to the left side of the drawing sheet, with respect to the light receiving area. For this reason, the address selecting section 51 makes minor adjustments to the column-direction time offset $\varphi$ in such a manner that, for example, the distance measurement pixels and the positional correction pixels are shifted toward the right side of the drawing sheet by an amount corresponding to ⅕₀ of one pixel.

If an amount of minor adjustment to the column-direction time offset $\varphi$ exceeds a predetermined amount (for example, a fractional portion of the minor adjustment amount exceeds 1), the address selecting section 51 generates an address signal so as to actually move the distance measurement pixels and the positional correction pixels by one pixel.

In the process of minor adjustment to the row-direction position offset R0 and the row-direction interval $\Delta R$, the same processing as the minor adjustment processing to the column-direction time offset $\varphi$ is performed.

If the positional correction evaluation value of the pixel (a) of FIG. 20(A) is greater than that of the pixel (b), it is suggested that the distance measurement pixels are shifted to the downward side of the drawing sheet, with respect to the light receiving area. For this reason, the address selecting section 51 makes minor adjustments to the row-direction position offset R0 and the row-direction interval $\Delta R$ in such a manner that, for example, the distance measurement pixels and the positional correction pixels are shifted toward the top of the drawing sheet for an amount corresponding to ⅕₀ of one pixel.

If the positional correction evaluation value of the pixel (b) shown in FIG. 20(A) is greater than that of the pixel (a), it is suggested that the distance measurement pixels are shifted toward the top of the drawing sheet, with respect to the light receiving area. For this reason, the address selecting section 51 makes minor adjustments to the row-direction position offset R0 and the row-direction interval $\Delta R$ in such a manner that, for example, the distance measurement pixels and the positional correction pixels are shifted toward the bottom side of the drawing sheet for an amount corresponding to ⅕₀ of one pixel.

If amounts of minor adjustments to the row-direction position offset R0 and the row-direction interval $\Delta R$ exceed a predetermined amount (for example, a fractional portion of the minor adjustment amount exceeds 1), the address selecting section 51 generates an address signal so as to actually move the distance measurement pixels and the positional correction pixels by one pixel.

With the above-described method, the scanning of the laser light L1 emitted from the emission optical system 20 can be followed automatically by the scanning of pixels selected in the light detector 40, with high-level accuracy.

In the above-described minor adjustments to the column-direction time offset $\varphi$, the row-direction position offset R0, and the row-direction interval $\Delta R$, similarly to the initial setting of the column-direction time offset $\varphi$, an object is required. For this reason, the measurement processing section 60 integrates the outputs from the positional correction pixels over a period of time during which scanning is performed in a lower-half of one frame corresponding to the road surface.

On the other hand, in the minor adjustments to the column-direction time offset $\varphi$, the row-direction position offset R0, and the row-direction interval $\Delta R$, it is desirable to use a road surface relatively far from the vehicle, unlike for the initial setting in which the column-direction time offset $\varphi$ greatly changes. In the non-coaxial optical system of the present embodiment, since the optical axis of the emitted light L1 from the emission optical system 20 and the optical axis of the reflected light L2 incident on the light reception optical system L2 differ from each other, if the reflected light L2 travels over a long distance, the directions of those optical axes are usually adjusted so as to match. However, for the reflected light L2 travelling a short distance, a difference (parallax) occurs between the direction of the optical axis of the emitted light L1 and the direction of the optical axis of the reflected light L2. If a road surface relatively far from the vehicle is used as an object, it is possible to reduce the parallax caused to the reflected light from the object and the influence thereof as compared to the case of using a road surface relatively close to the vehicle, and thereby possible to improve accuracy in the minor adjustments.

FIG. 22 is a table showing positional correction signals generated in the light receiving area selection operation in the distance measurement device according to the third embodiment. FIG. 22 shows an example of the directions of correction for the distance measurement pixel area indicated by the positional correction signals generated in accordance with the amplitude relationship of the output values of the positional correction pixels at the four corners shown in FIG. 15(C).

As shown in FIG. 22, if the output value of the bottom left pixel is larger than the output values of the pixels at the other three corners, the positional correction signal is generated so as to shift the pixels in the lower part of the distance measurement pixel area in the leftward direction.

If the output value of the bottom right pixel is larger than the output values of the pixels at the other three corners, the positional correction signal is generated so as to shift the pixels in the lower part of the distance measurement pixel area in the rightward direction.

If the output values of the bottom right pixel and the bottom left pixel are larger than the output values of the pixels at the other two corners, the positional correction signal is generated so as to shift all pixels in the distance measurement pixel area in the downward direction.

If the output value of the top left pixel is larger than the output values of the pixels at the other three corners, the positional correction signal is generated so as to shift the pixels in the upper part of the distance measurement pixel area in the leftward direction.

If the output values of the top left pixel and the bottom left pixel are larger than those of the pixels at the other two corners, the positional correction signal is generated so as to shift all pixels in the distance measurement pixel area in the leftward direction.

If the output values of the top left pixel and the bottom right pixel are larger than the output values of the pixels at the other two corners, the positional correction signal is generated so as to shift the upper pixels in the distance measurement pixel area in the leftward direction and the lower pixels in the rightward direction.

If the output values of the top left, bottom right, and bottom left pixels are larger than the output value of the top right pixel, the positional correction signal is generated so as to shift the upper pixels in the distance measurement pixel area in the leftward direction and all pixels in the downward direction.

If the output value of the top right pixel is larger than the output values of the pixels at the other three corners, the positional correction signal is generated so as to shift the upper pixels in the distance measurement pixel area in the rightward direction.

If the output values of the top right pixel and the bottom left pixel are larger than the output values of the pixels at the other two corners, the positional correction signal is generated so as to shift the upper pixels in the distance measurement pixel area in the rightward direction and the lower pixels in the leftward direction.

If the output values of the top right pixel and the bottom right pixel are larger than the output values of the pixels at the other two corners, the positional correction signal is generated so as to shift all pixels in the distance measurement pixel area in the rightward direction.

If the output values of the top right, bottom right, and bottom left pixels are larger than the output value of the top right pixel, the positional correction signal is generated so as to shift the upper pixels in the distance measurement pixel area in the rightward direction and all pixels in the downward direction.

If the output values of the top right pixel and the top left pixel are larger than the output values of the pixels at the other two corners, the positional correction signal is generated so as to shift all pixels in the distance measurement pixel area in the upward direction.

If the output values of the top right pixel, the top left pixel, and the bottom left pixel are larger than the output value of the bottom right pixel, the positional correction signal is generated so as to shift all pixels in the distance measurement pixel area in the upward direction and the lower pixels in the leftward direction.

If the output values of the top right pixel, the top left pixel, and the bottom right pixel are larger than the output value of the bottom left pixel, the positional correction signal is generated so as to shift all pixels in the distance measurement pixel area in the upward direction and the lower pixels in the rightward direction.

The correction directions shown in FIG. 22 are merely examples, and a discretionary setting can be applied in accordance with the output values of the positional correction pixels.

As described above, a sum of the output values of the top left pixel and the top right pixel shown in FIG. 15(C) may correspond to the output value of the pixel (a) in FIG. 15(A). A sum of the output values of the bottom left pixel and the bottom right pixel shown in FIG. 15(C) may correspond to the output value of the pixel (b) in FIG. 15(A). A sum of the output values of the top left pixel and the bottom left pixel shown in FIG. 15(C) may correspond to the output value of the pixel (c) in FIG. 15(A). A sum of the output values of the top right pixel and the bottom right pixel shown in FIG. 15(C) may correspond to the output value of the pixel (d) in FIG. 15(A). Thus, even in the case where the positional correction pixels are arranged at positions differing from those in FIG. 15(C) (for example, the arrangement shown in FIG. 15(A)), a table of correction directions similar to the one in FIG. 22 can be produced.

3.3 Advantageous Effects of Present Embodiment

According to the third embodiment, the distance measurement device 1 can perform a selected pixel correction operation with neither the need of a sensor (not shown) for scanning positions and angles of an emission optical system 20, nor a signal transmitting system for such a sensor. For this reason, it is possible to reduce cost as compared with a correction operation that requires such a sensor and a signal transmitting system.

Furthermore, as described above, the selected pixels correction operation according to the third embodiment does not require a sensor for scanning positions and angles of an emission optical system 20 angle. For this reason, it is unnecessary to consider a deviation in correspondence between a positional correction signal and a signal of such a sensor, and a theoretically more robust correction operation can be thereby realized. Furthermore, since the correction operation is independent of the sensor, etc. of the emission optical system 20, the light receiving system has high independency that allows for free combination of an emission system and a light receiving system, thereby leading to enhanced convenience.

A plurality of column-direction positional correction pixels are arranged in the same row position, and a plurality of row-direction positional correction pixels are arranged at the same column position. The column-direction positional correction pixels and the row-direction positional correction pixels are simultaneously output. Thus, scanning of the selected pixels allows for all pixel outputs to be obtained at each sampling timing, even if each sampling timing involves a different illumination position.

3.4 Modifications

In the foregoing third embodiment, a first synchronization method for synchronizing the scanning of the selected pixels in the light detector 40 (the scanning in the light receiving system) with the scanning of the emission optical system 20 has been described; however, the third embodiment is not limited to this method. For example, a second synchronization method in which the scanning of the emission optical system 20 is synchronized with the scanning of the light receiving system may be adopted, or the first synchronization method and the second synchronization method may be combined as appropriate.

For example, if the second synchronization method is adopted, the adjustment of the column-direction time offset $\varphi$ may be replaced with the adjustment to the offset time for the emission trigger of the laser light L1. If the offset time for the emission trigger is adjusted instead of the column-direction time offset $\varphi$, a minimum offset time for the emission trigger (specifically, a few nano seconds) may be set as an amount of correction in the order of some tenths of one pixel in the minor adjustment processing. Since in some cases the offset time for the emission trigger can be adjusted more easily than the column-direction time offset φ, the load in the selected pixel correction operation can be reduced.

If the second synchronization method is adopted for step ST50 in FIG. 17, an emission angle of the laser light L1 (corresponding to the amplitude a in the first synchronization method) according to the light receiving surface of the light receiving section 41 can be determined, and therefore problems, such as only partial or no illumination of the reflected light L2 (reflected to a position off the receiving surface) can be obviated. As a result, it is possible to enhance efficiency in using the laser light L1 or to effectively use the light receiving surface of the light receiving section 41, thereby leading to improved distance measurement performance. The correction with the first synchronization method, on the other hand, can be completed within the light receiving system; therefore, system independency is high and the method itself is simple. Thus, both the first and the second synchronization methods have advantages, and it is preferable to have both as applicable methods so that either the more suitable is chosen, or both can be combined, as appropriate.

4. Fourth Embodiment

Next, the distance measurement device according to a fourth embodiment will be described. The fourth embodiment differs from the first through third embodiments in how the S/N (signal-to-noise) ratio of obtained output signals of the pixels PX is improved through a use of output signals of the neighboring pixels PX. In the following, descriptions of configuration and operation similar to the first embodiment will be omitted, and differences will be mainly described.

4.1 Configuration of Digital Processing Section

FIG. 23 is a block diagram showing a configuration of a digital processing section of the distance measurement device according to the fourth embodiment.

As shown in FIG. 23, an analog signal of each pixel PX output from the light receiving section 41 is converted to a digital signal by the AFE 61 and input into the digital processing section 62. The digital processing section 62 includes an averaging section 65, a tilt restoration section 66, and an interpolating section 67.

The digital data input into the digital processing section 62 has a data structure in which a tilt, similar to that described above, of laser light L2 incident on the light receiving section 41 is ignored. The data structure in which a tilt is ignored has a two-dimensional data space associated with the emission order of the laser light L1 and the data order, for example. The details of the tilt-ignored data structure will be described later.

The averaging section 65 performs the processing of averaging or accumulating a digital signal corresponding to a target pixel using a plurality of digital signals corresponding to neighboring pixels of the target pixel (hereinafter "averaging processing"). Through such averaging processing, a noise component included in the digital signal corresponding to a target pixel can be reduced with respect to a signal component.

More specifically, the averaging section 65 performs averaging processing on digital data input from the AFE 61 having a data structure in which a tilt is ignored (tilt-ignored data), and generates post-averaging tilt-ignored data. The averaging section 65 transmits the generated post-averaging tilt-ignored data to the tilt restoration section 66.

The tilt restoration section 66 has a function of converting the data having a data structure in which a tilt is ignored into data having a data structure in which a tilt is considered (tilt-restored data). The data structure in which a tilt is considered has a two-dimensional data space associated with a row direction and a column direction. In other words, the two-dimensional data space of the data structure in which the tilt is considered differs from the two-dimensional data space of the data structure in which a tilt is ignored. The details of the data structure in which a tilt is considered will be described later.

Upon receipt of the post-averaging tilt-ignored data from the averaging section 65, the tilt restoration section 66 generates post-averaging tilt-restored data based on the received data. The tilt restoration section 66 transmits the generated post-averaging tilt-restored data to the interpolating section 67.

The interpolating section 67 has a function of generating data interpolated in a manner such that intervals of data items in the tilt-restored data are equal (post-interpolation data). Upon receipt of the post-averaging tilt-restored data from the tilt restoration section 66, the interpolating section 67 generates the post-averaging interpolated data based on the received data. The interpolating section 67 transmits the generated post-averaging interpolated data to, for example, an external image processing section.

4.2 Averaging Processing

Next, the averaging processing is explained with reference to FIG. 24.

Figure 24:
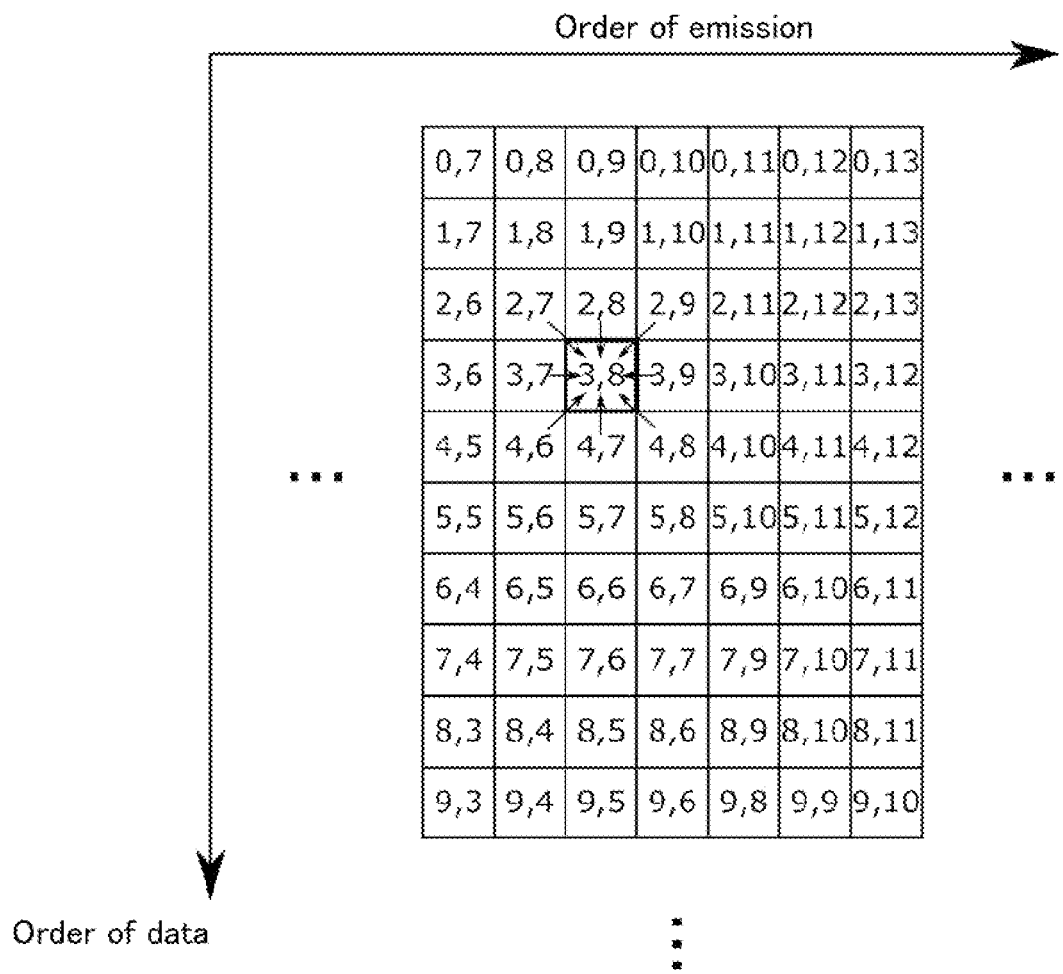
FIG. 24 is a schematic diagram for explaining a data structure of tilt-ignored data generated in the digital processing section of the distance measurement device according to the fourth embodiment.

FIG. 24 is a schematic diagram showing a data structure in which a tilt is ignored being generated in the digital processing section of the distance measurement device according to the fourth embodiment. FIG. 24 shows data corresponding to the column address <7> through column address <13> of the data obtained in compliance with the parameter table shown in FIG. 10. In FIG. 24, a single set of data D<x,y> is shown as a square enclosing a set of numbers "x,y" that represents the row address <x> and the column address <y> of a corresponding pixel PX.

As shown in FIG. 24, in the data structure in which a tilt is ignored, series of data corresponding to emitted laser light L1 (namely, the laser light L2 incident on the light receiving section 41) are vertically aligned and the emission order of the laser light L1 is indicated by the left-to-right direction of the drawing sheet. In the example of FIG. 24, the row addresses of the pixels PX corresponding to respective data items in the vertically aligned series of data are in ascending order from the top to the bottom of the drawing sheet.

For example, of the series of data obtained by the light receiving area turned to an on state in correspondence to the column address <7>, data D<1,7> and data D<2,6> are data at positions deviated in the column direction. In the data structure in which a tilt is ignored, however, the deviation between data sets in a column direction is not expressed.

The averaging section 65 integrates, in the tilt-ignored data structure, data of the neighboring pixels PX into data of the pixels PX targeted for averaging processing, and then performs averaging. Specifically, for example, if the data D<3,8> is averaged, the averaging section 65 may use data D<2,7>, D<2,8>, D<2,9>, D<3,7>, D<3,9>, D<4,6>, D<4,7>, and D<4,8>.

4.3 Interpolation Processing

Next, the interpolation processing will be explained with reference to FIG. 25.

Figure 25:
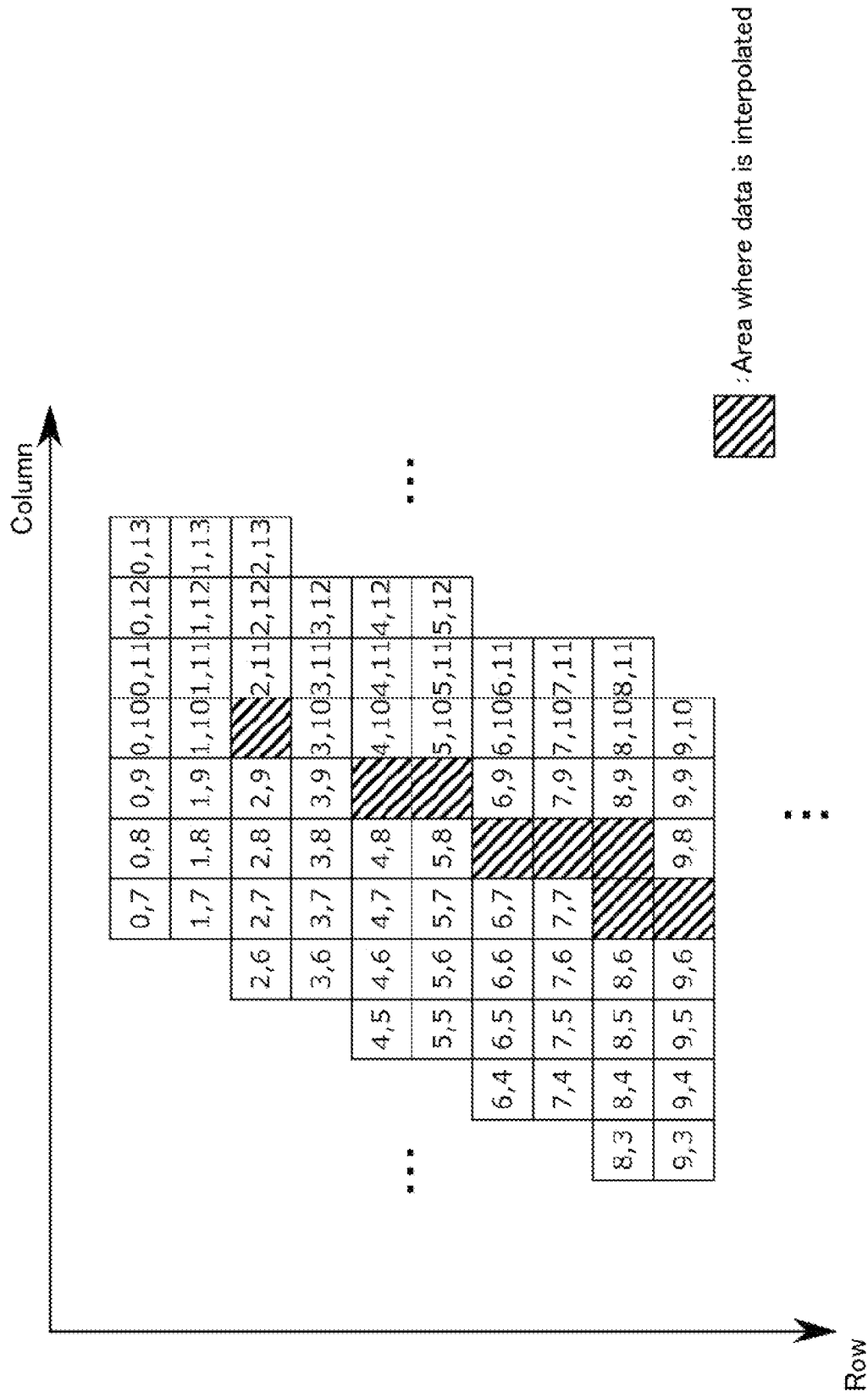
FIG. 25 is a schematic diagram for explaining a tilt-considered data structure generated by the digital processing section of the distance measurement device according to the fourth embodiment.

FIG. 25 is a schematic diagram showing a data structure in which a tilt is considered generated by the digital processing section of the distance measurement device according to the fourth embodiment, and it corresponds to FIG. 24.

As shown in FIG. 25, as the data structure in which a tilt is considered has a data structure corresponding to the two-dimensional arrangement of multiple pixels PX in the light receiving section 41, a deviation between data sets in the column direction can be expressed in the data structure. For this reason, if a tilt of the selected pixel area which may be turned to an on state in accordance with a column address is changed, empty areas (for example the shaded portions in FIG. 25) may occur.

The interpolating section 67 interpolates such areas containing no data and makes the intervals between data sets equal in the tilt-considered data structure. For example, the missing data D<2,10> in FIG. 25 is linearly interpolated by values of the data D<2,9> and D<2,11> and a column address. The data interpolation method is not limited to the above-described example, and any discretionarily chosen method can be adopted. If it is preferable to keep data-empty areas, interpolation is not necessarily performed.

4.4 Advantageous Effects of Present Embodiment

According to the fourth embodiment, the averaging section 65 performs averaging processing on the output data of the light receiving section 41, in advance of taking a tilt into account. The post-averaging tilt-ignored data is converted to tilt-restored data by the tilt restoration section 66 and then interpolated by the interpolating section 67. It is thereby possible to improve the S/N ratio of the distance measurement data which is output to an image processing section, and to relate a data structure of the distance measurement data to a space scanned by the laser light L1.

4.5 Modifications

In the foregoing fourth embodiment, the example of performing averaging processing on tilt-ignored data has been explained; however, the embodiment is not limited to this example. For example, the averaging processing may be performed on tilt-restored data.

FIG. 26 is a block diagram showing a configuration of a digital processing section of the distance measurement device according to a modification of the fourth embodiment, and it corresponds to FIG. 23.

As shown in FIG. 26, upon receipt of the tilt-ignored data from the AFE 61, the tilt restoration section 66 generates pre-averaging tilt-restored data based on the received data. The tilt restoration section 66 transmits the generated pre-averaging tilt-restored data to the interpolating section 67.

The interpolating section 67 generates, upon receipt of the pre-averaging tilt-restored data from the tilt restoration section 66, pre-averaging interpolated data based on the received data. The interpolating section 67 transmits the generated pre-averaging interpolated data to the averaging section 65.

The averaging section 65 performs, upon receipt of the pre-averaging interpolated data from the interpolating section 67, the averaging processing on the received data and generates post-averaging interpolated data. The averaging section 65 transmits the generated post-averaging interpolated data to an external image processing section, for example.

Figure 27:
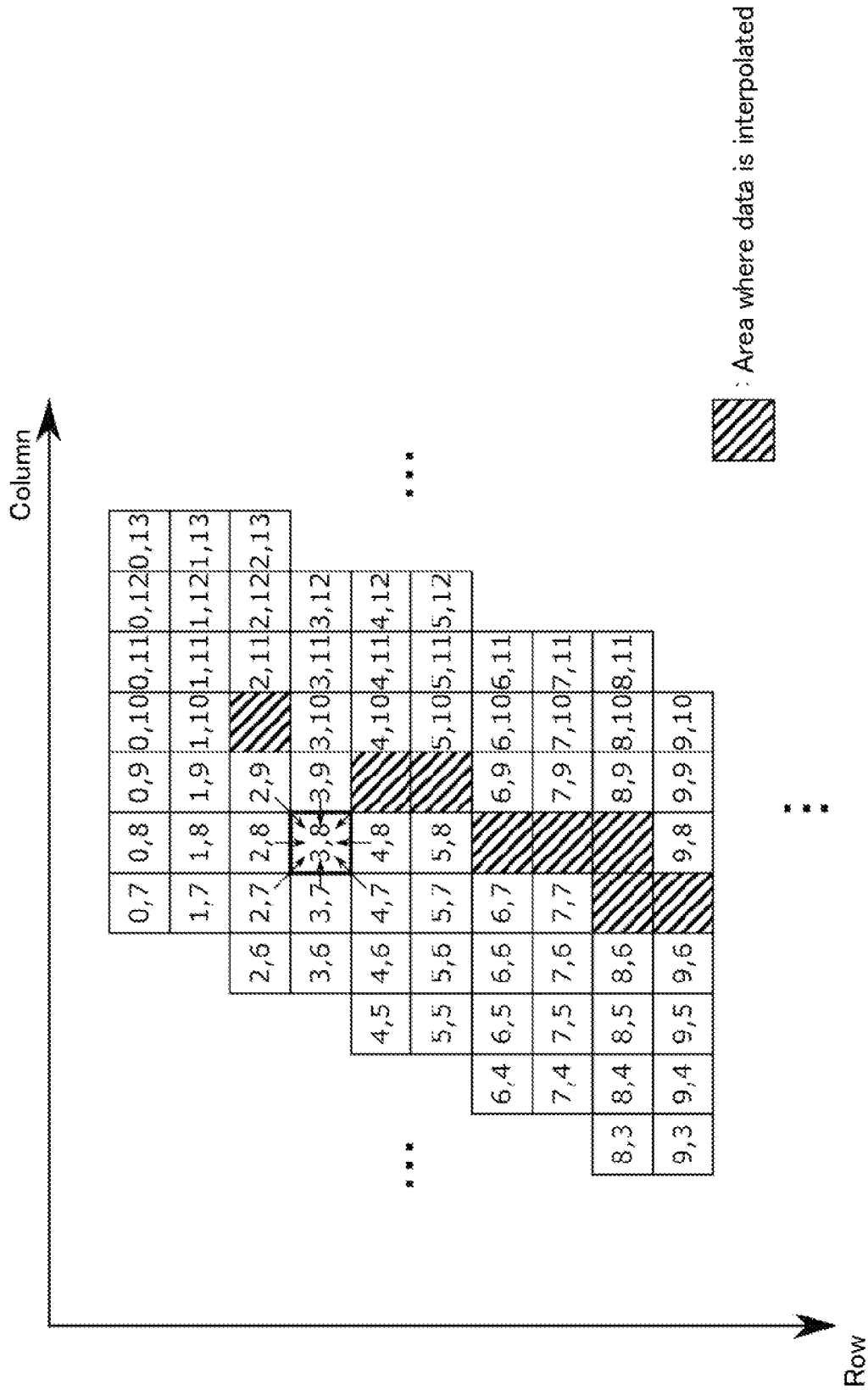
FIG. 27 is a schematic diagram for explaining a tilt-considered data structure generated by the digital processing section of the distance measurement device according to a modification of the fourth embodiment.

FIG. 27 is a schematic diagram showing a data structure in which a tilt is considered generated by the digital processing section of the distance measurement device according to the modification of the fourth embodiment, and it corresponds to FIG. 25.

As shown in FIG. 27, to average the data D<3,8> in a manner similar to FIG. 24, the averaging section 65 uses data D<2,7>, D<2,8>, D<2,9>, D<3,7>, D<3,9>, D<4,7>, and D<4,8> but does not use data D<4,6>. The averaging section 65 additionally uses data D<4,9> generated by the interpolating section 67 when performing the averaging processing performed on the data D<3,8>.

According to the above configuration, the averaging processing can be more accurately performed through using data equally spaced by the interpolation.

In the foregoing descriptions, to simplify the descriptions, the processing is described as a consecutive algorithm in a case where a processor having a large memory size performs software processing. In reality, however, the amount of processing involved in averaging is enormous, and difficult to complete with an ordinary personal computer or a GPU (graphics processing unit); such processing thus needs to be implemented through dedicated hardware (such as an integrated circuit (IC) or a field programmable gate array (FPGA)). The averaging, on the other hand, requires sampling data of a single time series for each pixel. The sampling data corresponding to a frame as such shown in FIGS. 24 and 27 require a large memory size, it is therefore unrealistic to implement the processing of such data through dedicated hardware. Thus, in reality, minimum sets of sampling data corresponding to the most immediate emissions of laser light L1 are maintained for the averaging processing to be performed thereupon. Reproduction of tilt as shown in FIG. 27, meanwhile, is realized through hardware that can be performed in parallel by the following procedures: only differences in amounts of row-direction shifting are calculated (normally, a maximum of two pixels), extra sampling data for the difference is maintained, and sampling data of a pixel shifted only by a shift amount corresponding to a targeted pixel is integrated at a timing-delay in line with the difference.

5. Others

The foregoing descriptions of the several embodiments have been made but the first though fourth embodiments are not limited to the above and various modifications are applicable.

For example, in the first through fourth embodiments, the shift circuits SH change a tilt in the column direction with respect to the row direction according to a column address; however, the embodiments are not limited to the example. For example, the shift circuits SH may be configured to change a tilt in the row direction with respect to the column direction according to a row address.

In the first through fourth embodiments, the shift control section 52 stores a single "shift interval" in the parameter table; however, the shift control section 52 may store multiple "shift intervals". It is thereby possible for the shift control section 52 to turn to an on state a light receiving area having a shape more suitable for the tilt of laser light L2 incident on the light receiving section 41.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit.

What is claimed is:
1. A light detector comprising:
  a plurality of pixels two-dimensionally arranged in a first direction and a second direction intersecting each other in a pixel area on a substrate, the pixels each including at least one sensor;

a control section; and
a shift circuit, wherein
the control section is configured to:
- turn, to an on state, a first subset of the pixels corresponding to a first partial pixel area in the pixel area based on first coordinate information of the pixel area in the first direction; and
- turn, to an on state, a second subset of the pixels corresponding to a second partial pixel area in the pixel area based on second coordinate information of the pixel area in the first direction, the second coordinate information being different from the first coordinate information, a first tilt of the first partial pixel area in the first direction with respect to the second direction differs from a second tilt of the second partial pixel area in the first direction with respect to the second direction,
the plurality of pixels include:
- a first pixel and a second pixel that are adjacent to each other in the second direction; and
- a third pixel and a fourth pixel that are adjacent to the second pixel in the first direction;

the shift circuit is configured to:
- in a case where the first subset of the pixels is turned on, couple the first pixel to a first one of the second to fourth pixels, the first one of the second to fourth pixels being aligned with the first tilt with respect to the first pixel; and
- in a case where the second subset of the pixels is turned on, couple the first pixel to a second one of the second to fourth pixels, the second one of the second to fourth pixels being aligned with the second tilt with respect to the first pixel.

2. The light detector according to claim 1, wherein of the plurality of pixels, a number of pixels arranged in the second direction is greater than a number of pixels arranged in the first direction.

3. The light detector according to claim 1, wherein the control unit is configured to increase an absolute value of the first tilt as the first coordinate information nears a maximum or minimum value of coordinate information of the pixel area in the first direction.

4. The light detector according to claim 1, wherein the shift circuit includes:
- a first switching element that includes a first end coupled to a first end of the first pixel, a second end coupled to a first node, and a control end to which a first signal is supplied;
- a second switching element that includes a first end coupled to the first end of the first pixel, a second end coupled to a second node, and a control end to which an inversion signal of the first signal is supplied;
- a third switching element that includes a first end coupled to the first node, a second end coupled to a first end of the second pixel, and a control end to which a second signal is supplied;
- a fourth switching element that includes a first end coupled to the first node, a second end coupled to a first end of the third pixel, and a control end to which an inversion signal of the second signal is supplied;
- a fifth switching element that includes a first end coupled to the second node, a second end coupled to a first end of the fourth pixel, and a control end to which the second signal is supplied; and
- a sixth switching element that includes a first end coupled to the second node, a second end coupled to the first end of the second pixel, and a control end to which the inversion signal of the second signal is supplied.

5. The light detector according to claim 4, wherein the shift circuit further includes:
- a first buffer circuit coupled between the third switching element and the first end of the second pixel and between the sixth switching element and the first end of the second pixel;
- a second buffer circuit coupled between the fourth switching element and the first end of the third pixel; and
- a third buffer circuit coupled between the fifth switching element and the first end of the fourth pixel.

6. The light detector according to claim 4, wherein the shift circuit further includes an OR circuit that includes a first input end to which the first signal is supplied, a second input end to which the second signal is input, and an output end coupled to a second end of the first pixel.

7. The light detector according to claim 1, wherein the first subset of the plurality of pixels includes a fifth pixel and a sixth pixel adjacent to each other in the first direction.

8. The light detector according to claim 1, wherein the sensor includes an avalanche photodiode including an anode coupled to a first power supply node, and a quench element including a first end coupled to a second power supply node and a second end coupled to a cathode of the avalanche photodiode, and
the control section is configured to apply a first voltage to the first power supply node and a second voltage higher than the first voltage to the second power supply node while turning the sensor on.

9. The light detector according to claim 1, wherein the control section is configured to:
- turn, to an on state, the first subset of the plurality of pixels and a fifth pixel and a sixth pixel arranged in the first direction or the second direction in a peripheral area adjacent to the first partial pixel area; and
- output first data from the fifth pixel and second data from the sixth pixel at a time.

10. The light detector according to claim 9, wherein the control section is configured to:
- perform scanning on the first partial pixel area over the pixel area;
- integrate each of the first data and the second data over a predetermined period of time during which scanning is performed on the first partial pixel area; and
- correct a position of the first subset of the plurality of pixels based on a relationship in data size between the integrated first data and the integrated second data.

11. A distance measurement device comprising:
a light source;
an emission optical system configured to emit an emission light from the light source;
a light receiving optical system configured to receive reflection of the emission light; and
the light detector according to claim 1.

12. The distance measurement device according to claim 11 further comprising
a processing section configured to generate third data of a third partial pixel area between the first partial pixel area and the second partial pixel area based on first data from the first subset of pixels and second data from the second subset of pixels.

13. The distance measurement device according to claim 12, wherein
the processing section is configured to average the first data using the second data, without using the third data.

14. The distance measurement device according to claim 12, wherein
the processing section is configured to average the first data using the third data.

* * * * *